United States Patent [19]
Yamamoto et al.

[11] Patent Number: 5,541,649
[45] Date of Patent: Jul. 30, 1996

[54] WHITE BALANCE ADJUSTMENT APPARATUS

[75] Inventors: Yasutoshi Yamamoto, Hirakata; Masayuki Yoneyama, Takatsuki; Tsutomu Mori, Settsu, all of Japan

[73] Assignee: Matsushita Electric Industrial Co., Ltd., Osaka, Japan

[21] Appl. No.: 529,686

[22] Filed: Sep. 18, 1995

Related U.S. Application Data

[62] Division of Ser. No. 349,955, Dec. 6, 1994, Pat. No. 5,481,302.

[30] Foreign Application Priority Data

Dec. 8, 1993 [JP] Japan .................... 5-307936

[51] Int. Cl.⁶ ........................................... H04N 9/73
[52] U.S. Cl. ........................................ 348/223; 348/655
[58] Field of Search .............................. 348/223, 227, 348/655, 656; 358/29 C, 29; H04N 9/73

[56] References Cited

U.S. PATENT DOCUMENTS

| | | |
|---|---|---|
| 5,016,094 | 5/1991 | Kaneko . |
| 5,021,874 | 6/1991 | Tsugita . |
| 5,045,928 | 9/1991 | Takaiwa et al. . |
| 5,264,921 | 11/1993 | Jinnai . |
| 5,361,093 | 11/1994 | Yamamoto et al. . |

FOREIGN PATENT DOCUMENTS

| | | |
|---|---|---|
| 0530793 | 3/1993 | European Pat. Off. . |
| 61-184079 | 8/1986 | Japan . |
| 1-318484 | 12/1989 | Japan . |
| 3-3497 | 1/1991 | Japan . |
| 4-989 | 1/1992 | Japan . |
| 4-988 | 1/1992 | Japan . |

*Primary Examiner*—Safet Metjahic
*Assistant Examiner*—Sherrie Hsia
*Attorney, Agent, or Firm*—Ratner & Prestia

[57] ABSTRACT

A white balance adjustment apparatus adjusts color component video signals of an aiming subject. The apparatus includes an amplifier for amplifying the color component video signals separately, a color temperature detector for detecting color temperature of the subject and for producing a color temperature signal, a memory for storing the color temperature signal and a selector for selecting either the color temperature signal currently produced by the color temperature detector or the color temperature signal previously stored in the memory.

4 Claims, 33 Drawing Sheets

WHITE BALANCE ADJUSTMENT APPARATUS

This application is a division of application Ser. No. 08/349,955, filed Dec. 6, 1994, U.S. Pat. No. 5,481,302.

BACKGROUND OF THE INVENTION

1. Field of the Invention

The present invention relates to a white balance adjustment apparatus used in video cameras and similar devices.

2. Description of the Prior Art

As the performance of white balance adjustment apparatuses for video cameras has improved in recent years, internal metering devices requiring no external sensors have become the mainstream. White balance control is the process whereby the color temperature of the light source on the subject being imaged by the camera is detected and compensation is applied so that achromatic image areas are recorded achromatically, i.e., so that white is white. One example of this type of white balance adjustment apparatus is described in Japanese patent laid-open publication number 61-184079.

An example of this conventional white balance adjustment apparatus is described below with reference to FIGS. 34 and 35. FIG. 34 is a block diagram of a conventional white balance adjustment apparatus comprising input terminals 1, white detector 2, integrator 3, white balance gain calculator 4, amplifier 5, and output terminals 6. FIG. 35 is an example showing the white detection area of the white detector 2 in this conventional white balance adjustment apparatus. In FIG. 35, the axis of abscissas is the B/G axis, the axis of ordinates is the R/G axis, the dotted line is the axis of color temperature change, and the area contained within the solid line is the white detection area.

The red (R), green (G), and blue (B) video signals input to input terminals 1a, 1b, and 1c are input to the white detector 2. The white detector 2 passes as output signals Rw, Gw, and Bw only those near-achromatic signal components of the input video signal that are within the white detection area shown in FIG. 35. The integrator 3 integrates one field of the near-achromatic video signal output from the white detector 2, and outputs integrated values Rs, Gs, and Bs. The white balance gain calculator 4 then calculates the white balance gain from the output signals Rs, Gs, and Bs from the integrator 3, and adjusts the amplification factor of the amplifier 5. The white-balanced video signals R', G', and B' are then output from the output terminals 6a, 6b, and 6c.

Because the video signals entering the white detection area are not necessarily achromatic, when relatively pale colors near the axis of color temperature change, e.g., white skin tones and greenery outdoors, enter the screen, the conventional apparatus described above falsely determines these color signals to be achromatic, resulting in washed-out colors with white skin tones becoming white.

SUMMARY OF THE INVENTION

Therefore, an object of the present invention is to provide a white balance adjustment apparatus for suppressing fading due to low saturation chromatic colors.

To achieve this object, according to the present invention, a white balance adjustment apparatus for adjusting color component video signals of an aiming subject, comprises: amplifying means for amplifying said color component video signals, separately; brightness detecting means for detecting a brightness of the subject; mode selecting means for selecting either one of an outdoor lighting mode and an indoor lighting mode in accordance with the brightness detected by said brightness detecting means; white detecting means for receiving said color component video signals for each pixel and detecting a pixel with color component video signals that falls in a narrow white range when said outdoor lighting mode is selected, and in a wide white range when said indoor lighting mode is selected; cumulating means for cumulating the number of detected pixels; white balance gain control means for controlling a gain of said amplifying means based on the cumulated result of said cumulating means.

A white balance adjustment apparatus thus comprised sets a white detection area according to the subject brightness information detected by the brightness information detecting means, integrates only the signals entering the set white detection area, and calculates the white balance gain from the integrated values to adjust the amplification factor. It is therefore possible to restrict the white detection area to the outdoor light distribution area when operating under bright outdoor lighting, thereby preventing the false evaluation of chromatic signals as achromatic signals even when relatively light colors near the axis of color temperature change, such as white skin tones and outdoor greenery, enter the screen.

BRIEF DESCRIPTION OF THE DRAWINGS

The present invention will become more fully understood from the detailed description given below and the accompanying diagrams wherein.

DESCRIPTION OF PREFERRED EMBODIMENTS

The first embodiment of a white balance adjustment apparatus according to the invention is described below with reference to the accompanying figures. The object of this embodiment is to use brightness information to determine whether the subject being recorded is exposed under a strong light, such as outdoor light, or under weak light, such as indoor light, and to prevent color fading and similar operating errors by restricting the color temperature detection frame when operating under strong light as in outdoor light.

Figure 1:
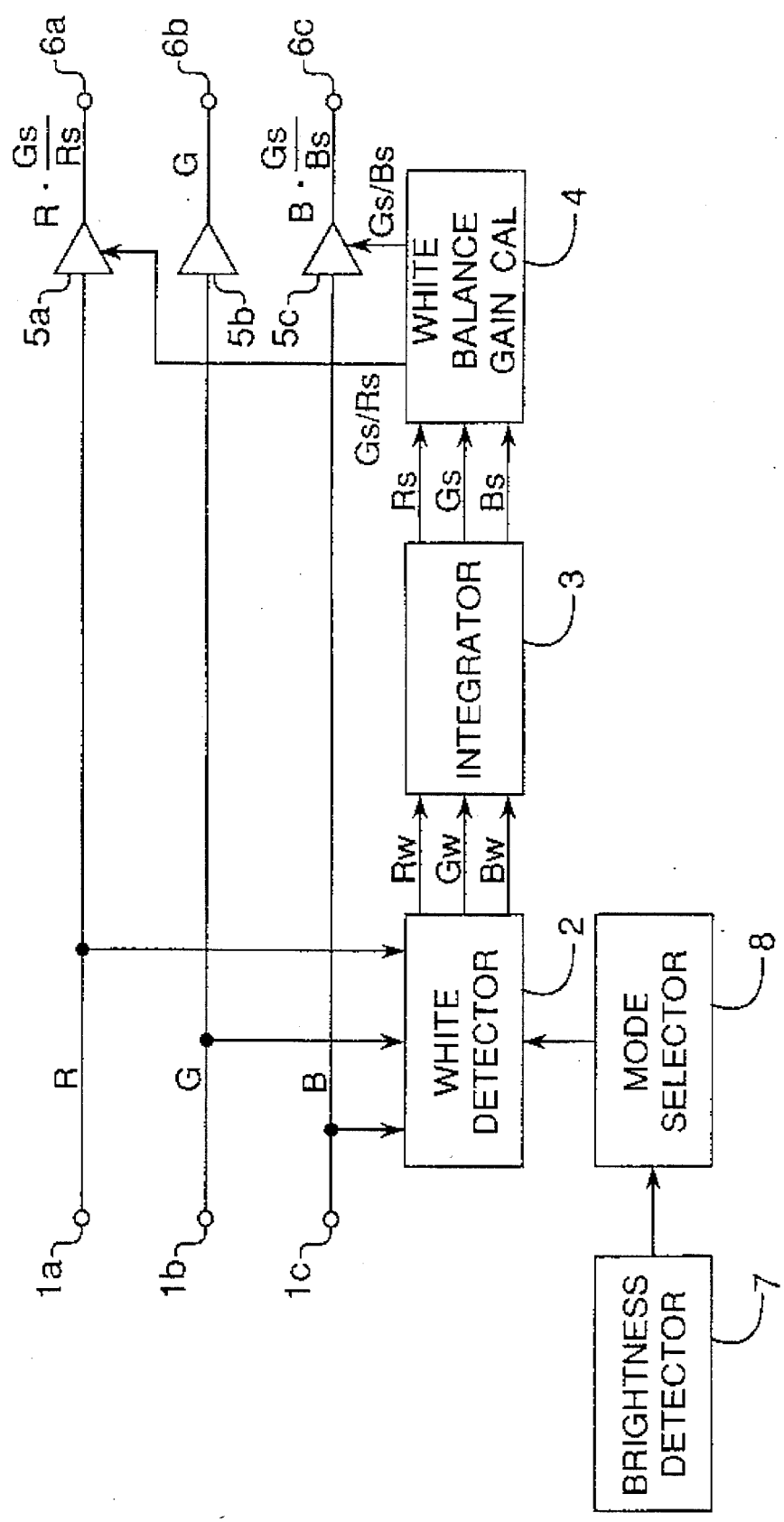
FIG. 1 is a block diagram of a white balance adjustment apparatus according to the first embodiment of the present invention.

FIG. 1 is a block diagram of a white balance adjustment apparatus according to the first embodiment of the invention. As shown in FIG. 1, the white balance adjustment apparatus comprises input terminals $1a$, $1b$, $1c$, a white detector 2, an integrator 3, a white balance gain calculator 4, amplifiers $5a$, $5b$, $5c$, output terminals $6a$, $6b$, $6c$, brightness detector 7, and mode selector 8.

Figure 2:
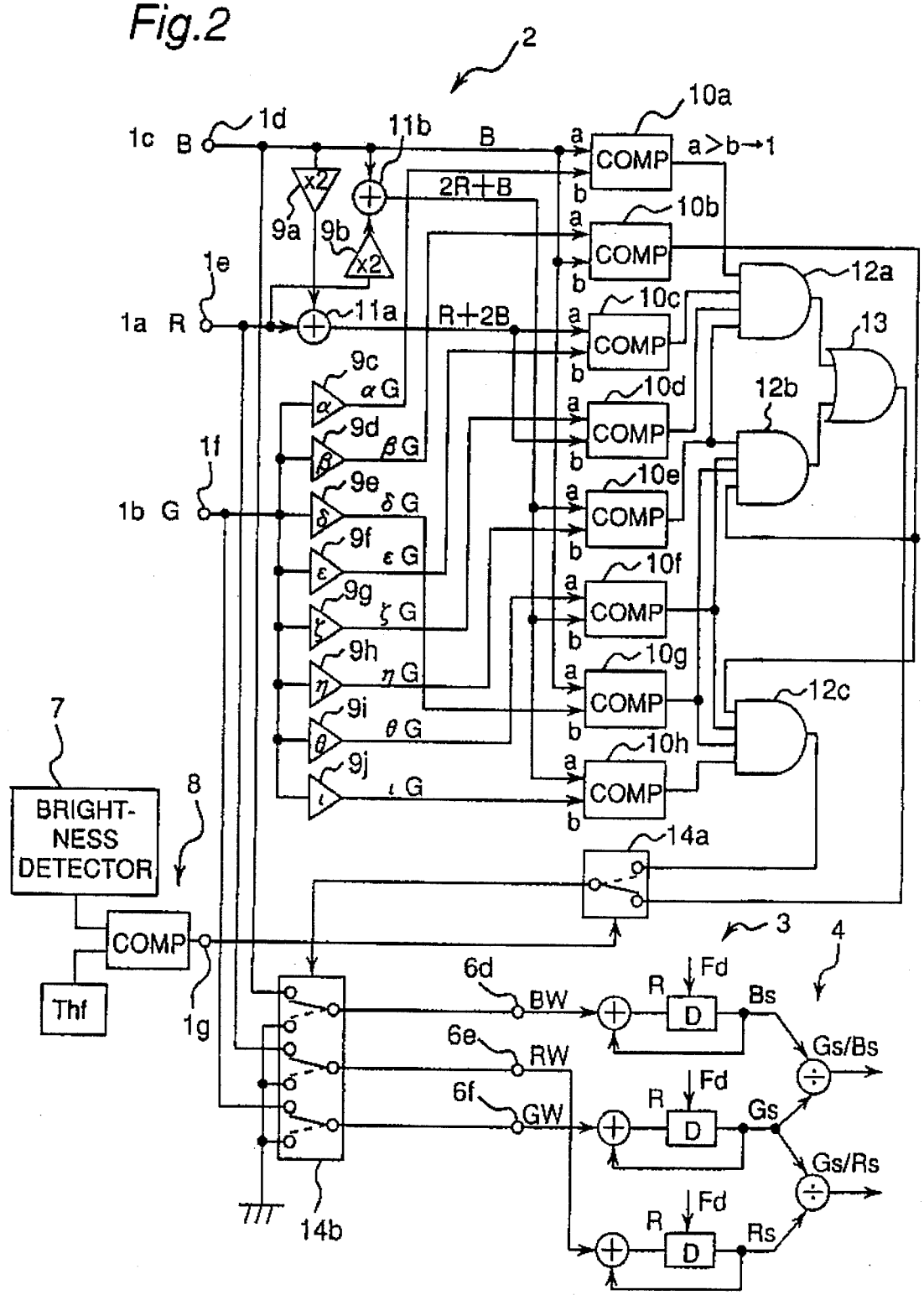
FIG. 2 is a block diagram of a white detector in the first embodiment.

As shown in FIG. 2, the mode selector 8 comprises a comparator which determines whether the subject being currently recorded is illuminated by strong light (outdoor light) or weak light (indoor light) based on the output signal from the brightness detector 7, and outputs a HIGH signal if the primary light source is determined to be strong light (outdoor light); it otherwise outputs a LOW signal. The brightness detector 7 used here may be the adjustor for the iris mechanism that adjusts the exposure of the imaging device. The comparator in the mode selector 8 compares the iris adjustment signal with a predetermined threshold level Thf, and determines the primary light source to be strong outdoor light when the iris is closed beyond a certain level, that is when the iris adjustment signal is greater than the threshold level Thf, and thus produces a HIGH signal.

The red (R), green (G), and blue (B) video signals input to input terminals $1a$, $1b$, and $1c$, and the output signal from the mode selector 8 are then input to the white detector 2.

FIG. 2 also shows a block diagram of the white detector 2 in a white balance adjustment apparatus according to the first embodiment of the present invention. As shown in FIG. 2, the white detector 2 comprises amplifiers $9a$, $9b$, $9c$, $9d$, $9e$, $9f$, $9g$, $9h$, $9i$, $9j$, comparators $10a$, $10b$, $10c$, $10d$, $10e$, $10f$, $10g$, $10h$, adders $11a$, $11b$, AND circuits $12a$, $12b$, $12c$, an OR circuit 13, and multiplexers $14a$, $14b$.

The B signal input to input terminal $1d$ of the white detector 2 is input to comparators $10a$, $10b$, and $10g$. The B signal input to input terminal $1d$ is also doubled by amplifier $9a$ and added to the R signal by adder $11a$, and the sum signal (R+2B) is input to comparators $10c$ and $10d$.

The R signal input to input terminal $1e$ is doubled by amplifier $9b$ and added to the B signal by adder $11b$, and the sum signal (2R+B) is input to comparators $10e$, $10f$, and $10h$.

The G signal input to input terminal $1f$ is multiplied α, β, δ, ε, ζ, η, θ and ι times, respectively, by amplifiers $9c$, $9d$, $9e$, $9f$, $9g$, $9h$, $9i$ and $9j$, and the resulting-products are input to comparators $10a$, $10b$, $10g$, $10c$, $10d$, $10e$, $10f$, and $10h$, respectively.

Comparator $10a$ compares the B signal with the α-times multiplied G signal, and outputs a HIGH signal if the B signal is greater. Comparator $10b$ compares the B signal with the β-times multiplied G signal, and outputs a HIGH signal if the β-times multiplied G signal is greater. Comparator $10c$ compares the (R+2B) signal with the ε-times multiplied G signal, and outputs a HIGH signal if the (R+2B) signal is greater. Comparator $10d$ compares the (R+2B) signal with the ζ-times multiplied G signal, and outputs a HIGH signal if the ζ-times multiplied G signal is greater.

Comparator 10e compares the (2R+B) signal with the η-times multiplied G signal, and outputs a HIGH signal if the (2R+B) signal is greater. Comparator 10f compares the (2R+B) signal with the θ-times multiplied G signal, and outputs a HIGH signal if the θ-times multiplied G signal is greater. Comparator 10g compares the B signal with the δ-times multiplied G signal, and outputs a HIGH signal if the B signal is greater. Comparator 10h compares the (2R+B) signal with the ι-times multiplied G signal, and outputs a HIGH signal if the (2R+B) signal is greater.

AND circuit 12a outputs a HIGH signal when the outputs from comparators 10a, 10c, 10d, and 10e are all HIGH. AND circuit 12b outputs a HIGH signal when the outputs from comparators 10b, 10e, 10f, and 10g are all HIGH. AND circuit 12c outputs a HIGH signal when the outputs from comparators 10b, 10f, 10g, and 10h are all HIGH.

The OR circuit 13 outputs a HIGH signal when the output from either AND circuit 12a or AND circuit 12b is HIGH. As a result, the OR circuit 13 outputs a HIGH signal when the condition defined by equation 1 below is satisfied.

$$\{\alpha G < B < \delta G \text{ AND}$$
$$\epsilon G < (R + 2B) < \zeta G \text{ AND}$$
$$2\eta G < (2R + B)\}$$
$$\text{or}$$
$$\{\delta G < B < \beta G \text{ AND}$$
$$2\eta G < (2R + B) < 2\theta G\}$$
[1]

The AND circuit 12c outputs a HIGH signal when the condition defined by equation 2 below is satisfied.

$$\delta G < B < \beta G \quad 2\iota G < (2R+B) < 2\theta G \qquad [2]$$

Figure 3:
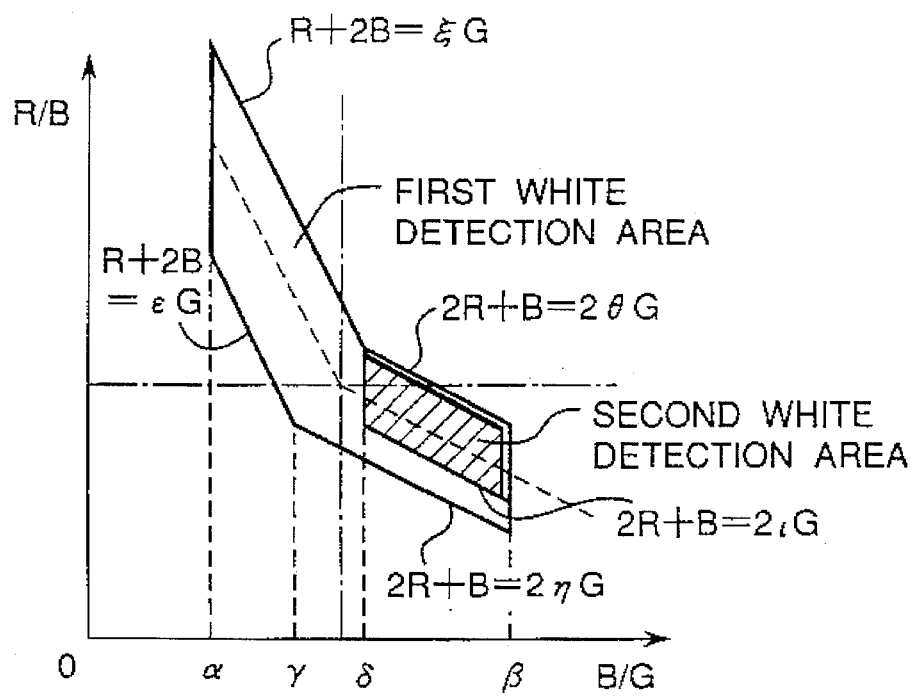
FIG. 3 is a graph of the color temperature coordinate space showing the white detection area of the white balance adjustment apparatus in the first embodiment of the invention.

The signal area or region satisfying these conditions is simulated in FIG. 3. In FIG. 3, the axis of abscissas is (B/G), the axis of ordinates is (R/G), and the dotted line in the shape of "<" is the axis of change in the color temperature of the light source. The wide region in which the OR circuit 13 outputs HIGH is the "<" shaped region defined by the solid line and indicated as a "first white detection area", and the narrow region in which the AND circuit 12c outputs HIGH is the shaded area which is indicated as a "second white detection area". The gain of amplifiers 9c–9j is adjusted so that this "<" shaped wide region covers the spectrum of both outdoor light and artificial light ranging in color temperature from, for example, 3000-K halogen lamps to 10,000-K outdoor light, and the shaded narrow region covers the spectrum of only outdoor light ranging in color temperature from, for example, 4500-K to 10,000-K.

In other words, a point is plotted in the graph of FIG. 3 in response to every pixel video data. The OR circuit 13 produces a HIGH signal when the plotted point falls within the first wide white detection area, and the AND circuit 12c produces a HIGH signal when the plotted point falls within the second narrow white detection area. Since the second narrow white detection area is completely contained in the first wide white detection area, the plotted point that falls in the second narrow white detection area always falls in the first wide white detection area.

The first wide white detection area is defined as an area in which the pixel color can be considered as white under indoor (weak) lighting. The second narrow white detection area is defined as an area in which the pixel color can be considered as white under outdoor (strong) lighting.

The output signals from the OR circuit 13 and AND circuit 12c are input to multiplexer 14a. When the white detection area setting signal from comparator 8 and input to input terminal 1g is LOW, representing the indoor weak lighting, multiplexer 14a selects the output signal from the OR circuit 13, as shown by the real line; and when the white detection area setting signal is HIGH, representing the outdoor strong lighting, multiplexer 14a selects the output signal from the AND circuit 12b, as shown by the dotted line.

The B, R, and G signals input to the input terminals 1d, 1e, and 1f of the white detector 2, respectively, are also input to the second multiplexer 14b. When the output from the first multiplexer 14a is HIGH, the second multiplexer 14b is turned to a position shown by the real line, so that the video signals are selected and applied to terminals 6d, 6e and 6f; when the output of multiplexer 14a is LOW, the second multiplexer 14b is turned to a position shown by the dotted line, so that "0" (the ground level) is output. The output signals from the multiplexer 14b are thus output from output terminals 6d, 6e, and 6f as the achromatic video signals Bw, Rw, and Gw from the white detector 2.

The Bw, Rw, and Gw output signals from the white detector 2 are then input to the integrator 3 for integrating each of the achromatic video signals Bw, Rw, and Gw.

As shown in FIG. 2, the integrator for integrating the achromatic video signal Bw includes an adder and a delay. The adder adds the data cumulated in the delay. The delay is reset at the end of each field. Thus, the delay cumulates the achromatic video signal Bw from all the pixels that are detected as the white point pixels. The delay produces an integrated signal Bs. The integrators for integrating the achromatic video signals Rw and Gw have the same structure as the integrator for integrating the achromatic video signal Bw. Thus, after every field, integrated signals Rs, Gs, and Bs are output.

Instead of the delay and adder, a counter can be used for cumulating the detected signal.

The output signals Rs, Gs and Bs from the integrator 3 are input to the white balance gain calculator 4, which is defined by two dividers. The first divider divides the signal Gs by the signal Bs to produce a quotient signal Gs/Bs. Similarly, the second divider divides the signal Gs by the signal Rs to produce a quotient signal Gs/Rs.

As shown in FIG. 1, the quotient signal Gs/Rs is applied to amplifier 5a which then produces a product signal Rx(Gs/Rs). Similarly, the quotient signal Gs/Bs is applied to amplifier 5c which then produces a product signal Rx(Gs/Rs). In this manner, the white-balanced signals are output from output terminals 6a, 6b, and 6c.

If the second narrow white detection area is not provided as in the prior art, the spectral distribution of light yellow, light green, white skin-toned subjects under outdoor light will fall within the first wide white detection area, so that the light yellow, light green and white skin-toned subjects are forcibly made white or whitish in the reproduced image.

However, according to the first embodiment, since the second white detection area is provided for the outdoor lighting, the white balance gain control is done with respect to purer white colors, resulting in a high accuracy white balance.

In the prior art, when the color temperature detection is done in the first white detection area in FIG. 3, the spectral distribution of yellow, green, and white skin-toned subjects under outdoor light will fall within this range, making light yellow and light green colors forcibly white. In other words, in the prior art, the white balance gain calculation is done for the whitish subjects that falls within the first white detection area for both indoor lights and outdoor lights. Thus, in the case of the outdoor lights, the light yellow, light green and white skin-toned subjects are all used for the basis of the white balance gain calculation.

However, according to the first embodiment, the white balance gain calculation is done with more whitish subject that falls in the second white detection area, so that white and other colors can be expressed with higher precision.

The effect of the present invention thus described is to determine from the brightness information whether the primary light source is indoor weak light or outdoor strong light, and restrict the range of the white detection area when the primary light source is outdoor light. As a result, the effects of chromatic colors in the indoor light spectrum, e.g., yellows, green, and white skin tones, when exposed to outdoor light can be avoided to enable accurate white detection, and high precision white balancing can be obtained.

A second embodiment of a white balance adjustment apparatus according to the present invention is described below with reference to the accompanying figures. The object of this embodiment is to determine the reliability of color temperature detection, and to thereby hold the control state from the previous detection period and not use the current color temperature information when the reliability is determined to be low.

Figure 4:
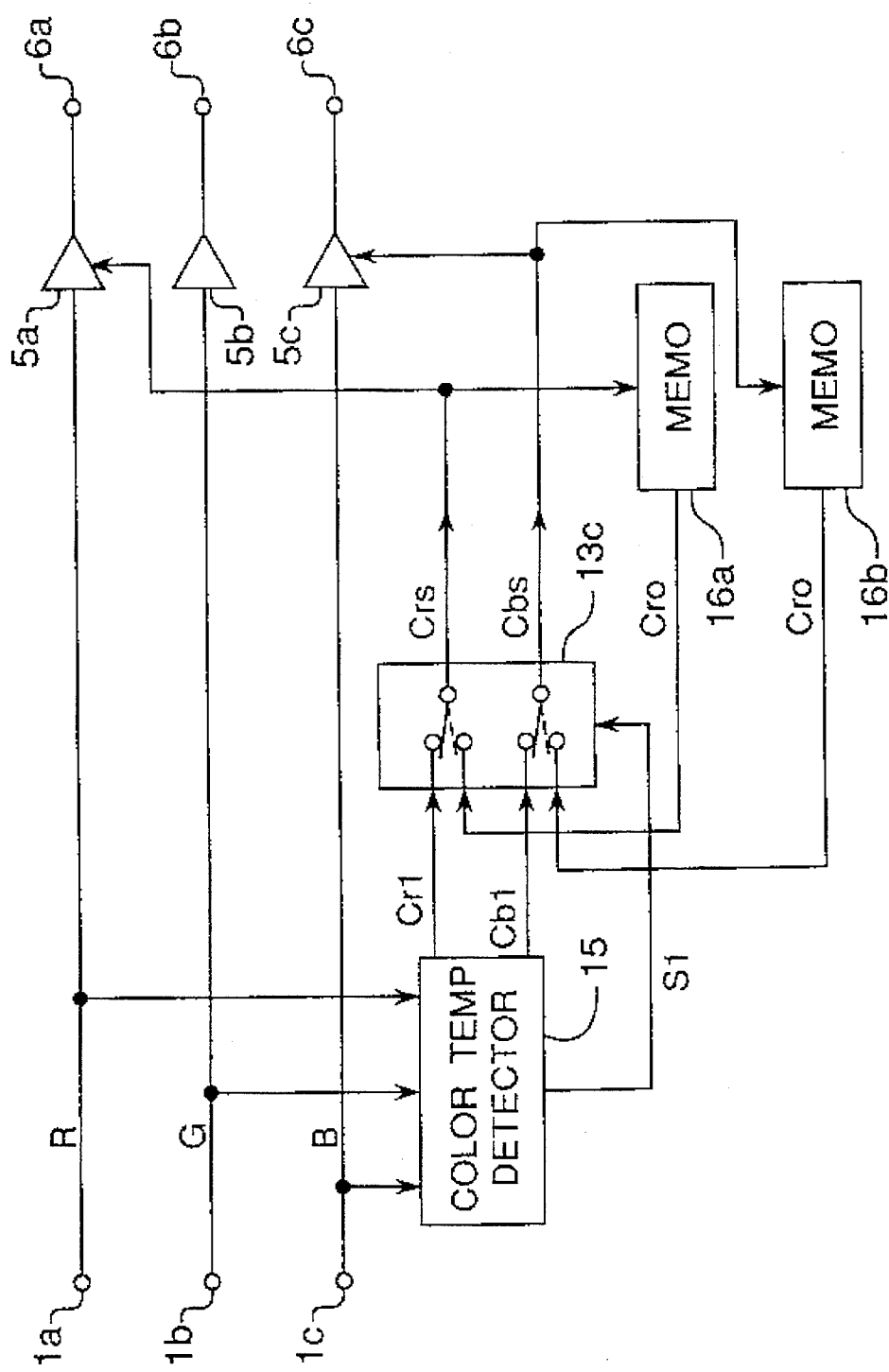
FIG. 4 is a block diagram of a white balance adjustment apparatus according to the second embodiment of the present invention.

FIG. 4 is a block diagram of a white balance adjustment apparatus according to the second embodiment of the invention. As shown in FIG. 4, the white balance adjustment apparatus comprises a multiplexer 13c, a color temperature detector 15 and memories 16a and 16b.

The red (R), green (G), and blue (B) video signals input to input terminals 1a, 1b, and 1c are further input to the color temperature detector 15. The color temperature detector 15 outputs color temperature information (Cr1, Cb1) and a reliability signal S1 based on the input video signals R, G, and B. A detail of the color temperature detector 15 is described below with reference to FIG. 5.

Figure 5:
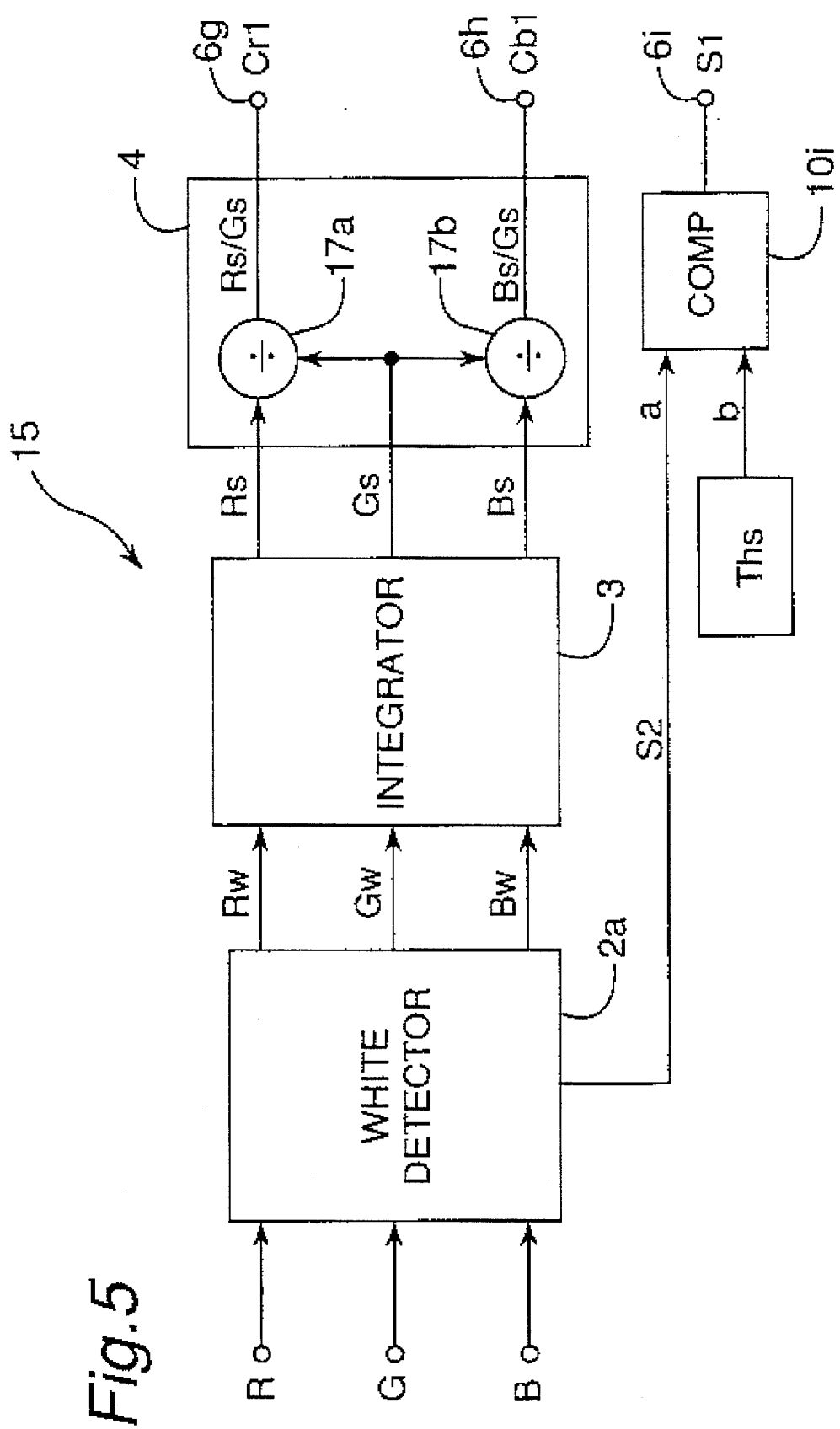
FIG. 5 is a block diagram of a color temperature detector in the second embodiment of the present invention.

As shown in FIG. 5, the color temperature detector 15 comprises a white detector 2a, integrator 3, dividers 17a and 17b, and a comparator 10i. The R, G, and B video signals are input to the white detector 2a. The white detector 2a selects only the achromatic signals Rw, Gw, and Bw from the R, G, and B input signals, and outputs a signal S2 expressing the amount of achromatic color in the field simultaneously to the output of Rw, Gw, and Bw.

Figure 7:
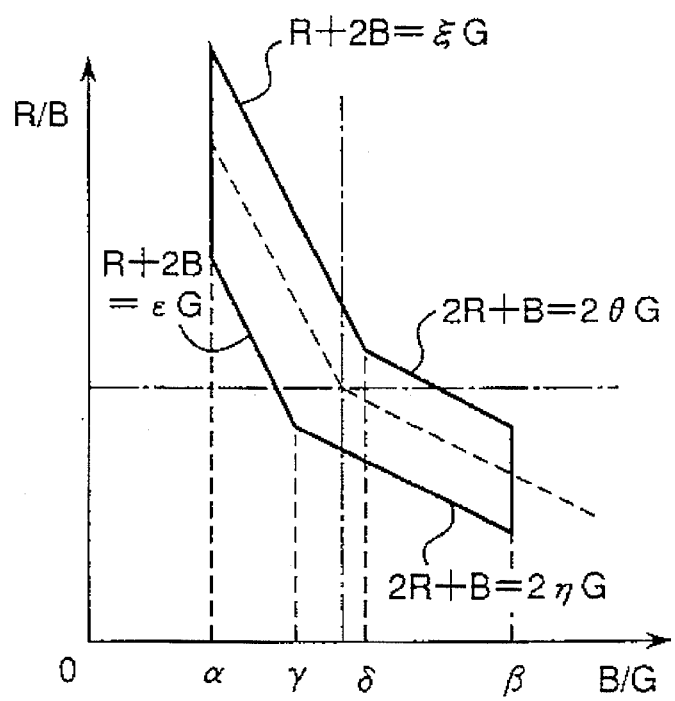
FIG. 7 is a graph of the color temperature coordinate space showing the white detection area of the white detector in the second embodiment.
Figure 6:
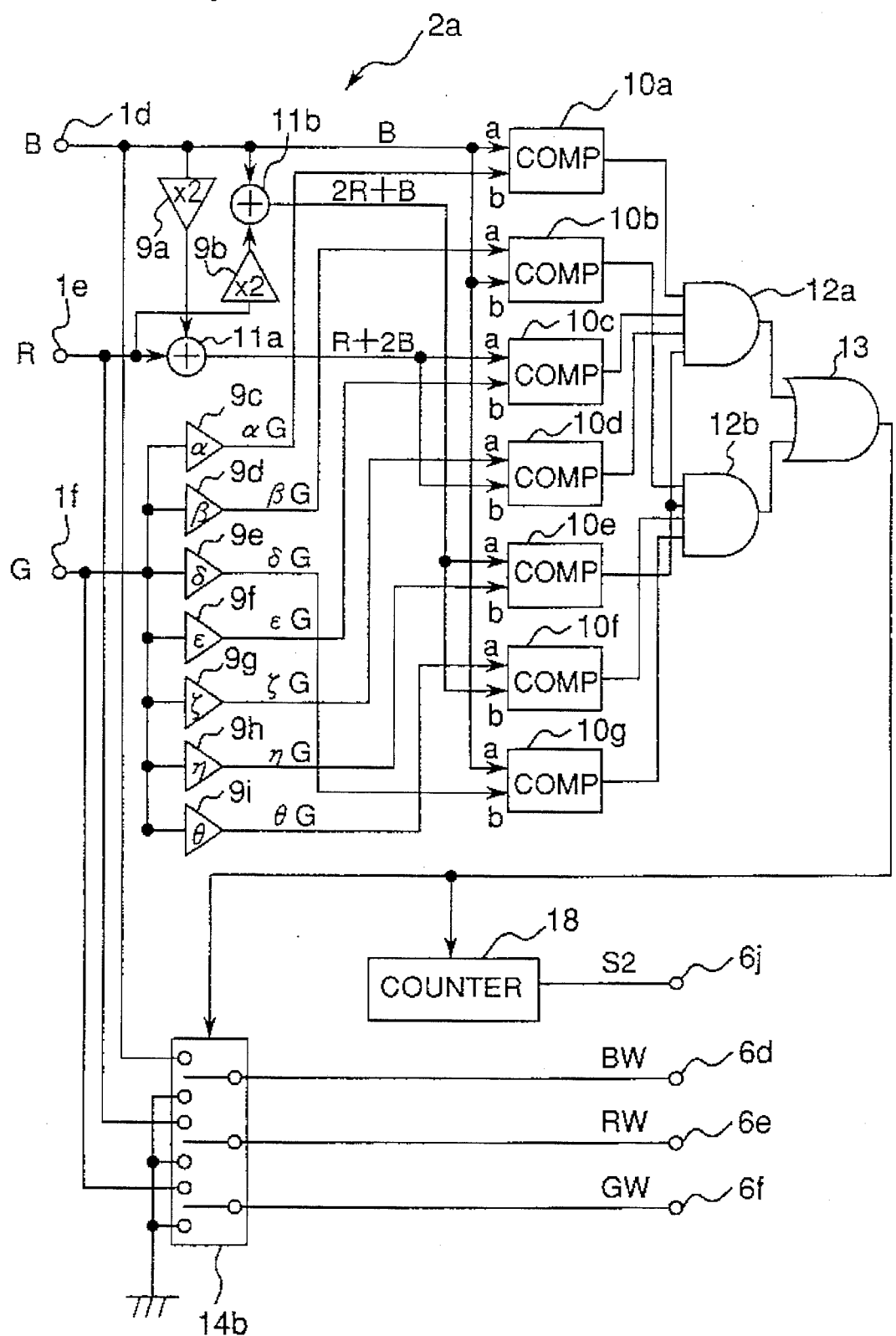
FIG. 6 is a block diagram of a white detector in the second embodiment.

FIG. 6 is a block diagram of the white detector 2a. The white detector 2a is essentially identical to that shown in FIG. 2 except that amplifier 9j, comparator 10h, AND circuit 12c, and multiplexer 14a have been removed and a counter 18 has been added. The operation is also essentially the same: OR circuit 13 outputs a HIGH signal when the combined R, G, and B video signals are within the white detection area shown by the solid line in FIG. 7. In FIG. 7, the axis of abscissas is (B/G), the axis of ordinates is (R/G), and the dotted line is the axis of change in the color temperature of the light source. The output signal from the OR circuit 13 is input to the counter 18, which counts the number of HIGH signals in one field period; that is the number of white-or whitish pixels that falls in the white detection area in one field. The count expresses the percentage of achromatic signals in one field, and is output as signal S2. The achromatic video signals Bw, Rw, and Gw are output from output terminals 6d, 6e, and 6f.

Next, referring to FIG. 5, the output signals Rw, Gw, and Bw from the white detector 2a are input to the integrator 3, integrated for one field period, and then output as Rs, Gs, and Bs. Output signals Rs and Gs from the integrator 3 are input to divider 17a, which outputs (Rs/Gs) as color temperature information Cr1. Output signals Bs and Gs from the integrator 3 are input to divider 17b, which outputs (Bs/Gs) as color temperature information Cb1. Dividers 17a and 17b define white balance gain calculator 4.

Signal S2 from the white detector 2a, which expresses the percentage of achromatic signal areas in one field, is input to comparator 10i for comparison with a known threshold Ths. When S2 is greater than the threshold value Ths, the comparator 10i outputs the signal S1 as a HIGH signal indicating that the output signals Cr1 and Cb1 from the color temperature detector 15 have reliability.

It is noted that counter 18 and comparator 10i define a white density detector for detecting a density of white pixels in one field and for producing the reliability signal when the density of white pixels is greater than a predetermined threshold level Ths.

The HIGH signal of signal S1 turns the multiplexer 13c in the real line position as shown in FIG. 4. In this case, the output signals Cb1 and Cr1 are output from multiplexer 13c as signals Crs and Cbs, and are applied respectively to amplifiers 5a and 5c, and also to memories 16a and 16b. Memories 16a and 16b hold the stored data until they are overwritten by the next signals Crs and Cbs.

Thus, in the next field, the multiplexer 13c receives the output signals Cb1 and Cr1 from the color temperature detector 15 and the color temperature information Cb0 and Cr0 stored in the memory 16. The reliability signal S1 from the color temperature detector 15 is also input to the multiplexer 13c. Multiplexer 13c selects Cb1 and Cr1 when signal S1 is HIGH, and selects Cb0 and Cr0 when S1 is LOW. The selected signals are output as Cbs and Crs.

It should be noted that achromatic image areas are not necessarily contained in every subject being recorded. When the achromatic color level of a given field is particularly low or zero, a white-detecting type white balance adjustment apparatus can misoperate and improperly adjust the white balance using the information provided by the color temperature detector.

The effect of the present embodiment is to obtain a high accuracy white balance by selecting whether to adjust the white-balance according to the currently detected color temperature information or to hold the current white balance adjustment based on the reliability of the color temperature detection provided from the color temperature detector, and thereby hold the current white balance adjustment when the achromatic color level of the field is low or zero.

It is to be noted that while the white detection counter output expressing the ratio of achromatic color in the field is used as the reliability information in the above embodiment, the same effect can be obtained using the integrated values Rs, Gs, and Bs of the video signal.

A third embodiment of a white balance adjustment apparatus according to the present invention is described below with reference to the accompanying figures. The object of this embodiment is to avoid color fading due to the presence of pale chromatic tones by not using the detected color temperature and holding the previous color temperature adjustment when the color temperature detected by the color temperature detector is close to the color temperature used for the current white balance adjustment control; when the detected color temperature is greater than or equal to the current control color temperature, color fading of pale chromatic tones is minimized by stopping white balance control tracking at the point the detected color temperature becomes less than the threshold value.

Figure 8:
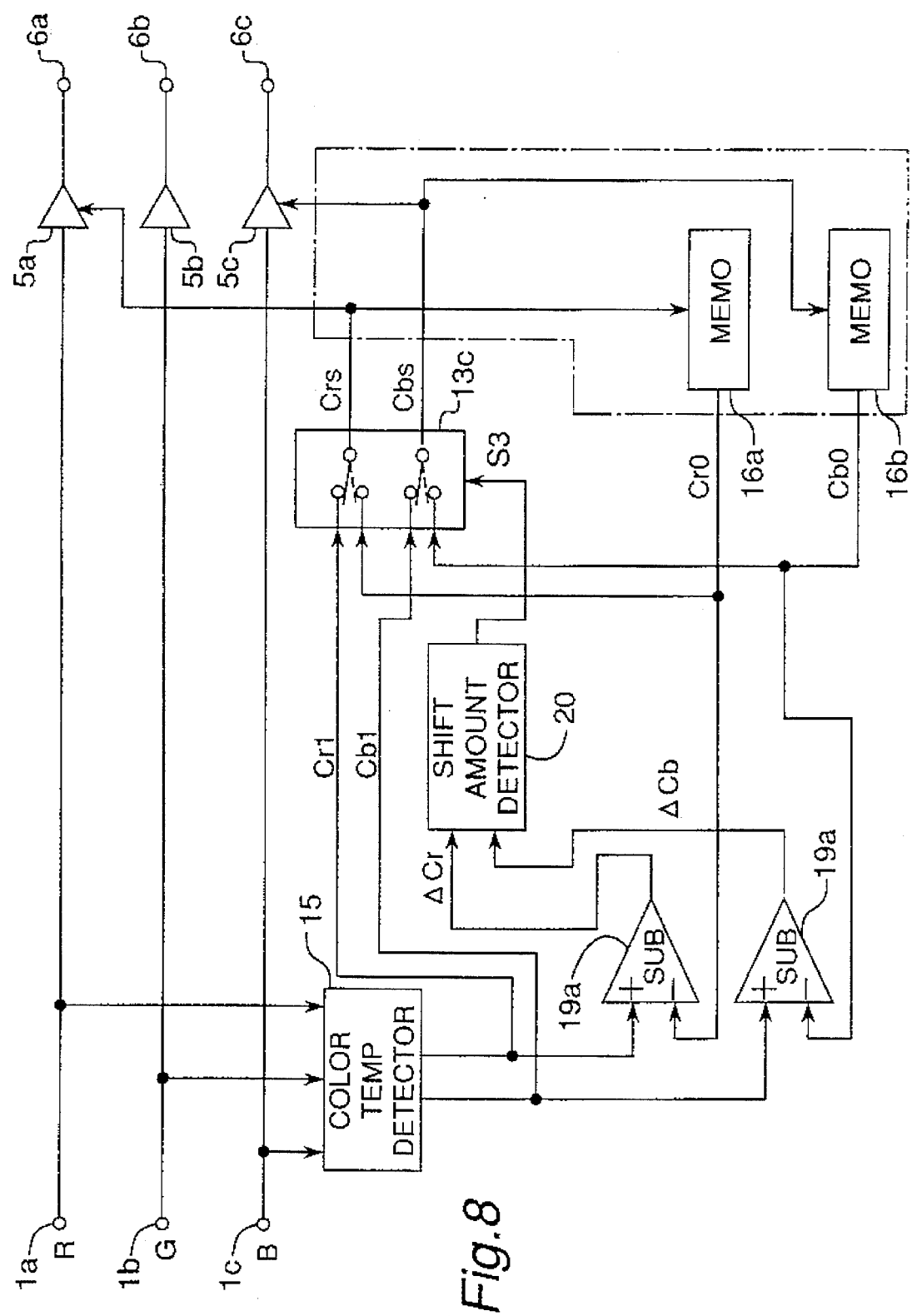
FIG. 8 is a block diagram of a white balance adjustment apparatus according to the third embodiment of the present invention.

FIG. 8 is a block diagram of a white balance adjustment apparatus according to the third embodiment of the invention. As shown in FIG. 8, the white balance adjustment apparatus comprises a color temperature detector 15, a multiplexer 13c, memories 16a and 16b, subtractors 19a and 19b, and a shift amount detector 20.

The red (R), green (G), and blue (B) video signals input to input terminals 1a, 1b, and 1c are further input to the color temperature detector 15, from which the color temperature information Cr1, Cb1 is output. The operation of the color temperature detector 15 here is the same as described in the second embodiment above, and further description is therefore omitted below. The subtractors 19a and 19b take inputs Cr1 and Cb1 from the color temperature detector 15, and the color temperature information Cb0 and Cr0 stored in the memories 16a and 16b and used for the current white balance control, and output difference signals ΔCr (=Cr1−Cr0) and ΔCb (=Cb1−Cb0), respectively. The shift amount detector 20 operates on the ΔCr and ΔCb output signals from the subtractors 19a and 19b to output shift amount signal S3. The detail of the shift amount detector 20 is described below with reference to FIGS. 9 and 10.

Figure 9:
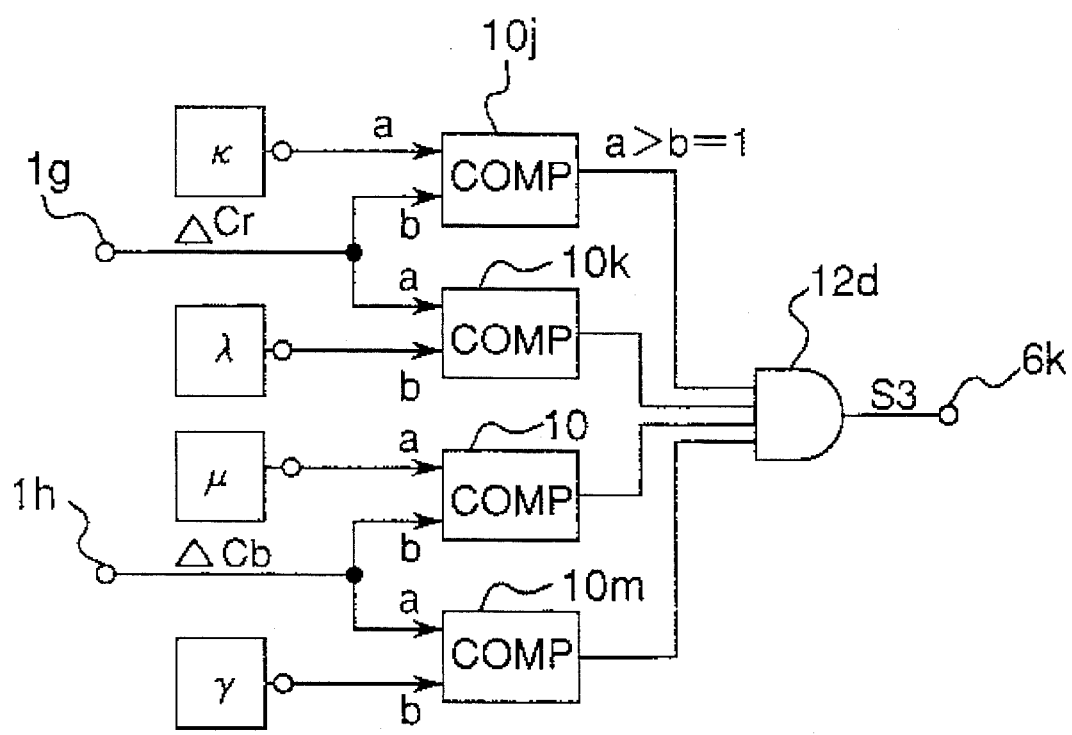
FIG. 9 is a block diagram of a shift amount detector in the third embodiment of the invention.

As shown in FIG. 9, the shift amount detector 20 comprises plural comparators 10j, 10k, 10l, 10m, constant generators for generating constants κ, λ, μ, and γ and an AND circuit 12d.

The difference signal ΔCr input to input terminal 1g is input to the first comparator 10j for comparison with value κ; if κ is greater than ΔCr, the comparator 10j outputs a HIGH signal. The difference signal ΔCr is also input to the next comparator 10k for comparison with value λ; if λ is less than ΔCr, the comparator 10k outputs a HIGH signal.

The difference signal ΔCb input to input terminal 1h is input to the next comparator 10l for comparison with value μ; if μ is greater than ΔCb, the comparator 10l outputs a HIGH signal. The difference signal ΔCb is also input to the next comparator 10m for comparison with value γ; if γ is less than ΔCb, the comparator 10m outputs a HIGH signal.

Each of the comparators 10j, 10k, 10l and 10m outputs to the AND circuit 12d. The AND circuit 12d outputs a HIGH shift amount signal S3 when all comparator output signals are HIGH, and otherwise outputs a LOW signal S3. As a result, the AND circuit 12d outputs a HIGH signal when the condition defined by equation [3] below is satisfied.

$$(\lambda < \Delta Cr < \kappa) \text{ AND } (\gamma < \Delta Cb < \mu) \quad [3]$$

Figure 10:
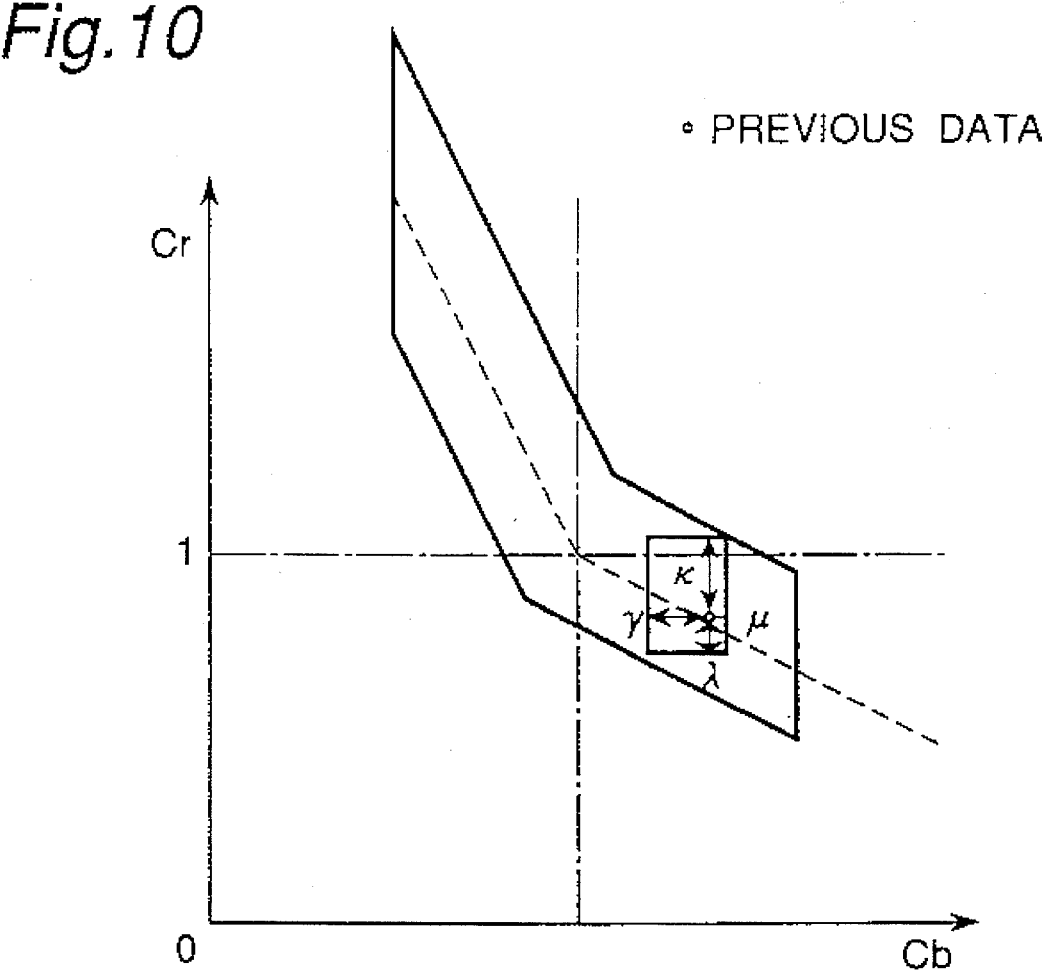
FIG. 10 is a color temperature coordinate space graph showing the white detection area in the third embodiment of the invention.

The range in which the condition of equation [3] is satisfied is simulated in the graph shown in FIG. 10. A point plotted by a circle (○) in FIG. 10 is the present data of the color temperature information Cb0, Cr0 used for the current white balance control. The rectangular area in FIG. 10 is the area in which equation [3] is satisfied; when the detected color temperature information Cb1, Cr1 is within this rectangular area, the AND circuit 12d outputs a HIGH signal. In other words, when the shift amount between the previous color temperature information Cb0, Cr0 and the newly obtained color temperature information Cb1, Cr1 is less than the range determined by the constants κ, λ, μ, and γ, the shift amount detector 20 produces a HIGH signal. Note that color temperature information Cb is on the axis of abscissas, color temperature information Cr is on the axis of ordinates, and the dotted line is the axis of color temperature change.

Referring again to FIG. 8, the Cb1 and Cr1 output signals from the color temperature detector 15 and the Cb0 and Cr0 signals stored in the memories 16a and 16b are input to the multiplexer 13c. Multiplexer 13c selects Cb0 and Cr0 (dotted line) when shift amount signal S3 is HIGH, selects Cb1 and Cr1 (real line) when shift amount signal S3 is LOW, and outputs the selected signals as Cbs and Crs.

The color temperature information Cbs and Crs from the multiplexer 13c are used for the amplification factors of the amplifiers 5a and 5c, and stored in memories 16a and 16b for comparison with the color temperature information Cb1, Cr1 in the next field.

Figure 11:
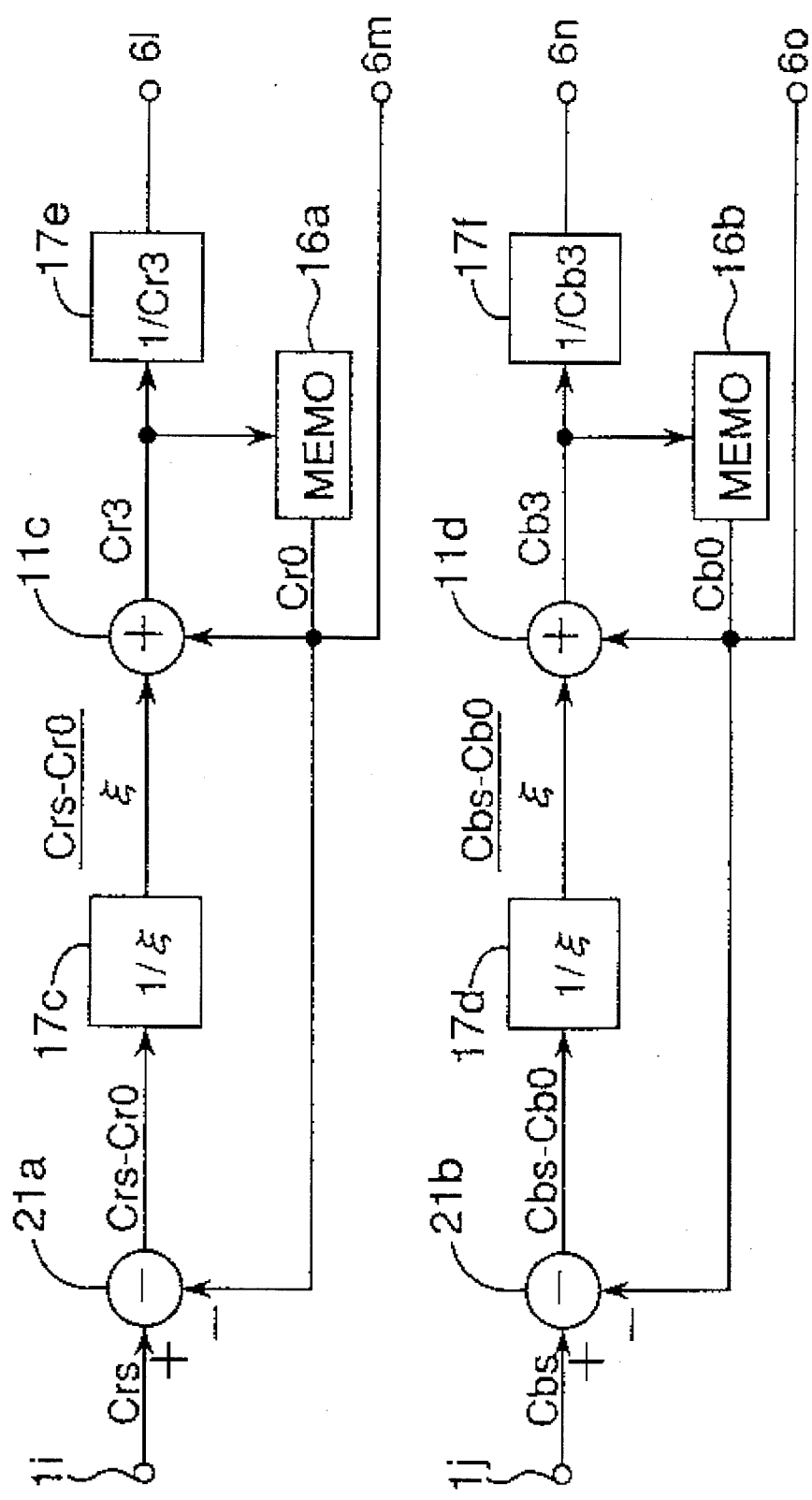
FIG. 11 is a block diagram of the white balance gain calculator in the third embodiment of the invention.

A block enclosed by the dot-dash line shown in FIG. 8 can be replaced with the white balance gain adjuster shown in FIG. 11.

As shown in FIG. 11, the white balance gain adjuster comprises subtractors 21a, 21b, dividers 17c, 17d, 17e, 17f, adders 11c, 11d, and memories 16a, 16b.

The color temperature information Crs input to input terminal 1i is input to the corresponding subtractor 21a. Subtractor 21a also receives the color temperature information Cr0 stored in the corresponding memory 16a and used for current white balance control. The subtractor 21a calculates and outputs the difference (Crs−Cr0) to the divider 17c. The divider 17c divides the input difference signal by ξ, and outputs the quotient signal (Crs−Cr0)/ξ to the adder 11c. The adder 11c adds (Crs−Cr0)/ξ with Cr0, and outputs sum Cr3 to the memory 16a and also to the divider 17e. Sum Cr3 is stored in memory 16a as the current color temperature information control value, and is simultaneously output from the output terminal 6m as Cr0. The divider 17e outputs the inverse of the input sum Cr3 as the amplification factor of the amplifier 5a from output terminal 61.

This same process is applied to the color temperature information Cbs input to input terminal 1j to obtain the amplification factor of the amplifier 5c and the current color temperature information control value Cb0.

Figure 12:
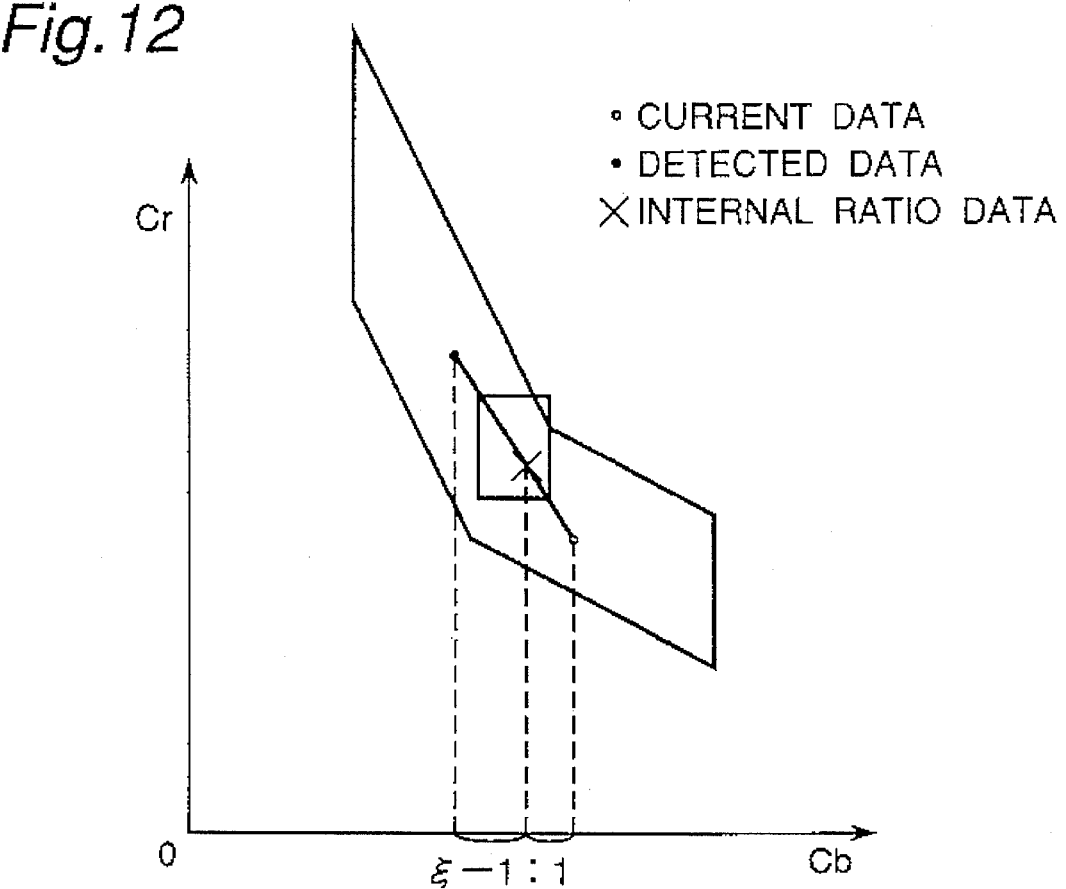
FIG. 12 is a color temperature coordinate space graph for the white balance adjustment apparatus of the third embodiment of the invention.

The color temperature information Cb3, Cr3 thus obtained is the point of division on the color temperature coordinates map of the detected color temperature coordinates (Cbs, Crs) and the color temperature coordinates (Cb0, Cr0) used currently for color temperature control using the internal ratio ξ-1:1 as shown in FIG. 12. In FIG. 12, the obtained color temperature information Cb3, Cr3 is point x, the detected color temperature coordinates Cbs, Crs are indicated as black circle point ●, and the color temperature coordinates (Cb0, Cr0) used currently for color temperature control are indicated as a white circle point ○; Cb is the axis of abscissas, and Cr is the axis of ordinates.

Because the above operation is repeated in a white balance adjustment apparatus as described above, when the current control color temperature and the detected color temperature are separated, the control value gradually approaches the detected color temperature. If the detected color temperature comes within the range of the rectangle shown in FIG. 12 as the control value approaches the detected color temperature, adjustment of the control value stops, and the control value will therefore not equal the detected value. While the detected color temperature information will therefore not be completely white, when color information such as white skin tones that will come within the white detection area are erroneously evaluated as the light source, chromaticity loss (fading) of those colors can be minimized with this operation.

When color information, such as white skin tones, within the white detection area are erroneously evaluated as the light source, the effect of this embodiment is to prevent fading by holding the current control state if, for example, the difference between the color information and the current control value is less than the threshold value, and to minimize fading of those colors even when the difference is greater than the threshold value.

A fourth embodiment of a white balance adjustment apparatus according to the present invention is described below with reference to the accompanying figures.

Figure 13:
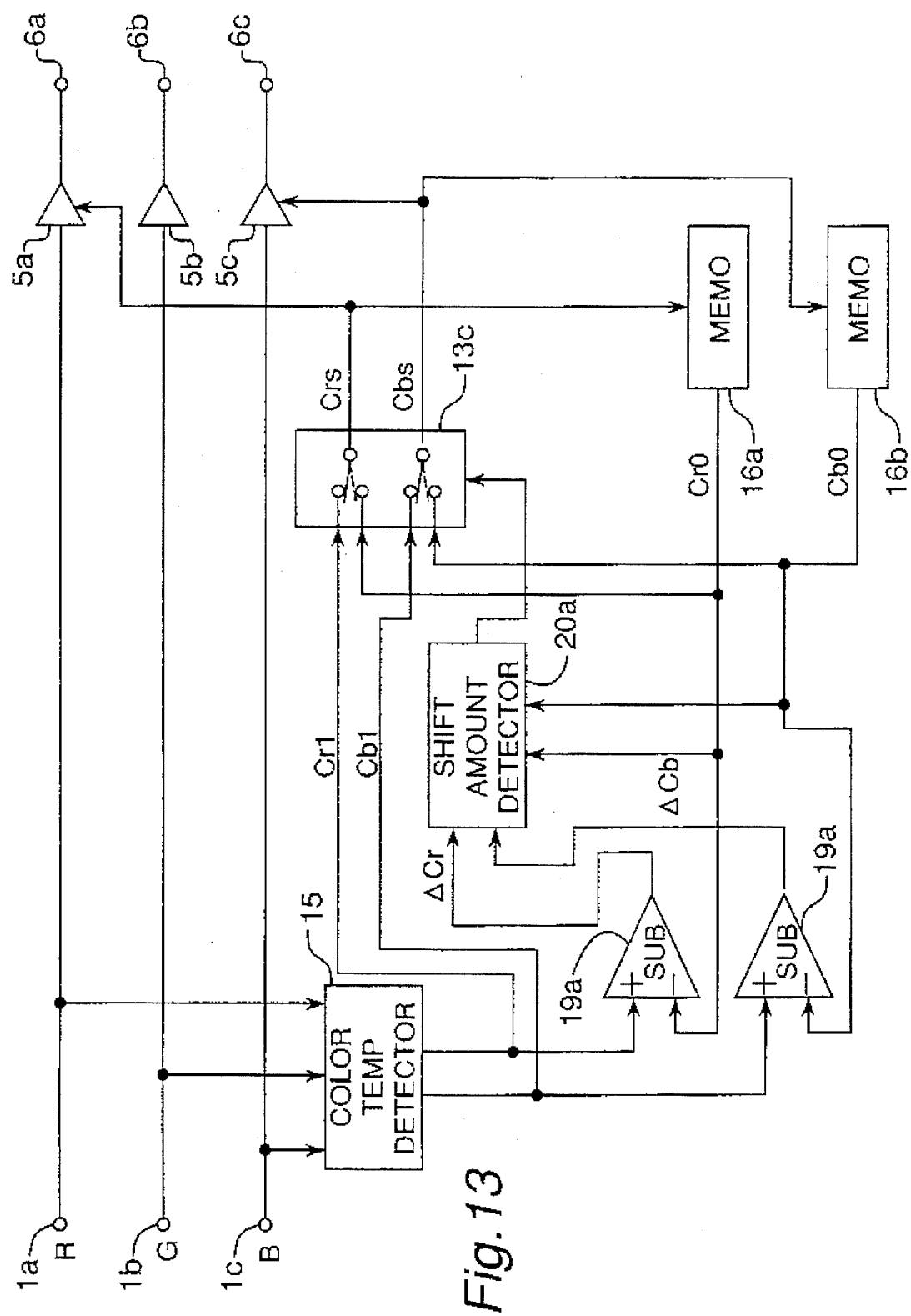
FIG. 13 is a block diagram of a white balance adjustment apparatus according to the fourth embodiment of the present invention.

FIG. 13 is a block diagram of a white balance adjustment apparatus according to this fourth embodiment of the invention. This fourth embodiment is essentially identical to the third embodiment shown in FIG. 8, differing in that the color temperature information Cb0, Cr0 used for the current white balance control and stored in the memories 16a and 16b are also input to the shift amount detector 20a.

The color temperature detector 15, subtractors 19a, 19b, multiplexer 13c, and memories 16a, 16b are the same as those described in the third embodiment above and is therefore omitted below. The shift amount detector 20a is described below.

Figure 14:
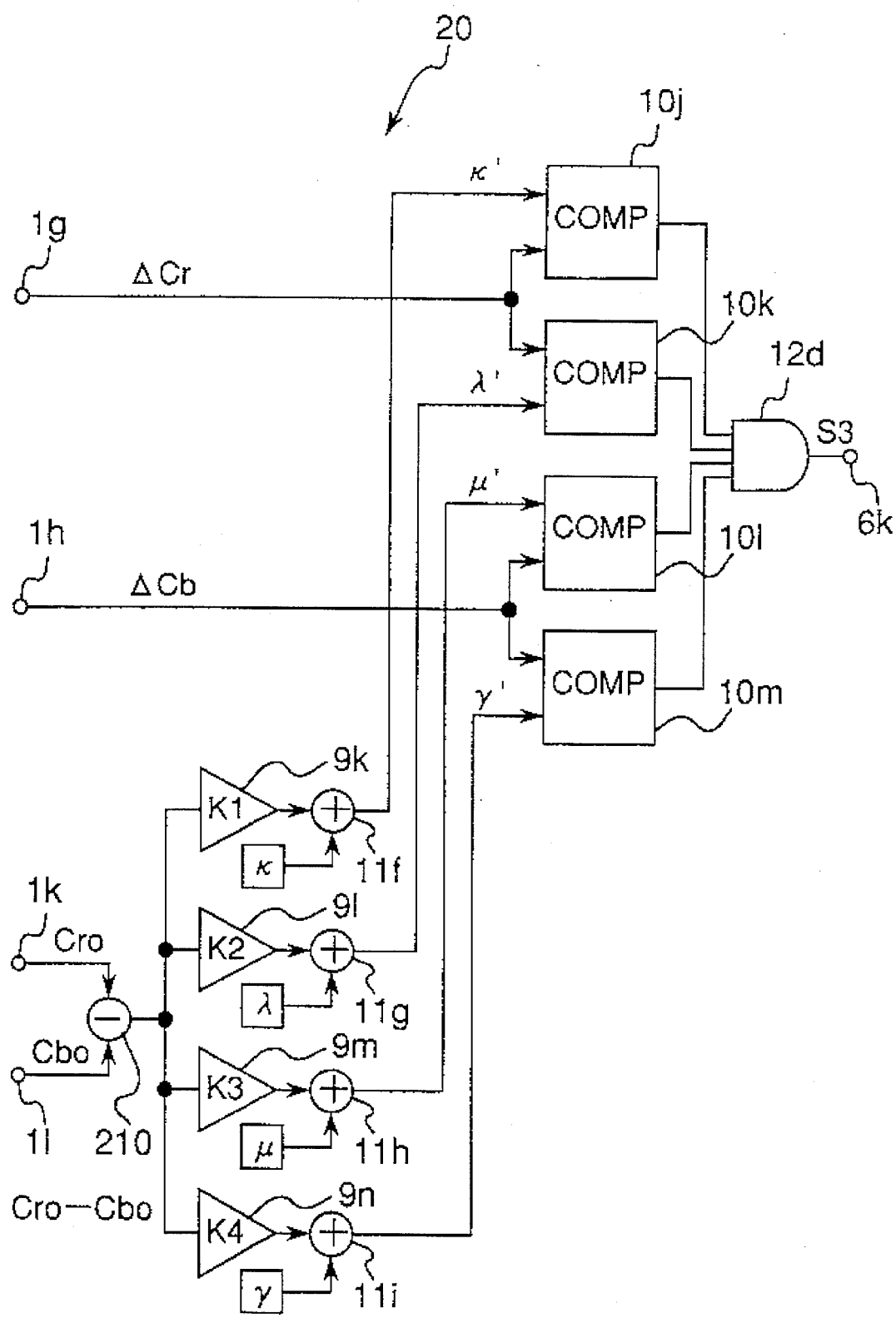
FIG. 14 is a block diagram of the shift amount detector in the fourth embodiment of the present invention.

As shown in FIG. 14, the shift amount detector 20a according to the fourth embodiment comprises subtractor 210, adders 11f, 11g, 11h, 11i, amplifiers 9k, 9l, 9m, 9n, comparators 10j, 10k, 10l, 10m, and an AND circuit 12d. The shift amount detector 20a shown in FIG. 14 differs from that shown in FIG. 9 by the addition of input terminals 1k and 1l; amplifiers 9k, 9l, 9m, and 9n; subtractor 210; and adders 11f, 11g, 11h, and 11i.

A difference between color temperature information Cb0 and Cr0 which are applied to input terminals 1k and 1l in FIG. 14 is obtained by the subtractor 210. The difference Cr0−Cb0 is applied to each of the amplifiers 9k–9n for amplification by K1, K2, K3, and K4 times. The adders 11f, 11g, 11h, and 11i add κ, λ, μ and γ, respectively, to the amplified signals output from the amplifiers 9k–9n, and output the sum signals as κ', λ', μ' and γ', respectively. As a result, the coefficients κ', λ', μ' and γ' input to comparators 10j, 10k, 10l, and 10m are applied as functions of (Cr0-Cb0) by the equations [4] below.

$$\kappa'=K1\ (Cr0-Cb0)+\kappa$$

$$\lambda'=K2\ (Cr0-Cb0)+\lambda$$

$$\mu'=K3\ (Cr0-Cb0)+\mu$$

$$\gamma'=K4\ (Cr0-Cb0)+\gamma \qquad [4]$$

The operation of the comparators 10j–10m and the AND circuit 12d are as described in the third embodiment above.

Figure 15:
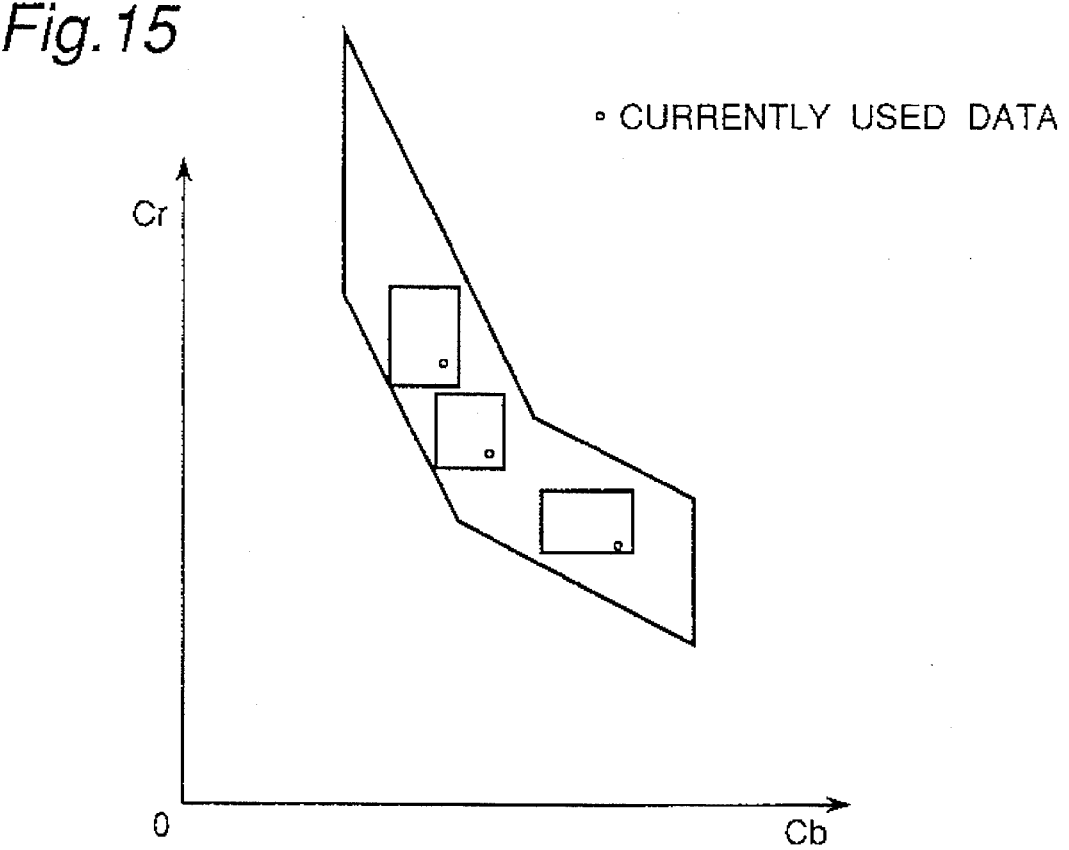
FIG. 15 is a color temperature coordinate space graph for the white balance adjustment apparatus of the fourth embodiment of the present invention.

By appropriately adjusting coefficients κ', λ', μ' and γ', the shape of the rectangular area can be changed. FIG. 15 shows three examples of different shapes of rectangles. Note that color temperature information Cb is on the axis of abscissas, color temperature information Cr is on the axis of ordinates, the "<"-shaped area is the white detection area, "o" indicates the color temperature information (Cb0, Cr0) currently used for control, and the rectangles are the areas determined by the currently used color temperature information (Cb0, Cr0) and the coefficients κ', λ', μ' and γ'.

The greatest problem relating to the fading of chromatic colors is white skin tones being washed out. White skin tones are easily mistaken as the light source when taking close-ups during recording. White skin tones in particular tend towards a distribution in the direction of the change in the color temperature, i.e., in a direction contacting the axis of color temperature change. The present embodiment is therefore characterized by changing the area in which the control value does not move to be long in the direction of the axis of color temperature change.

Because the area in which the control value does not move can be changed to be long in the direction of the axis of color temperature change, the effect of the present embodiment is to make it possible to adjust the white balance control so that fading of white skin tones is suppressed and the ability to track changes in the light source is simultaneously improved, and thereby obtaining white balance control with good precision.

A fifth embodiment of a white balance adjustment apparatus according to the present invention is described below with reference to the accompanying figures. The object of this fifth embodiment is to obtain higher precision white balance control by mapping to the axis of color temperature change by a mapping conversion the color temperature information detected by the color temperature detector.

Figure 16:
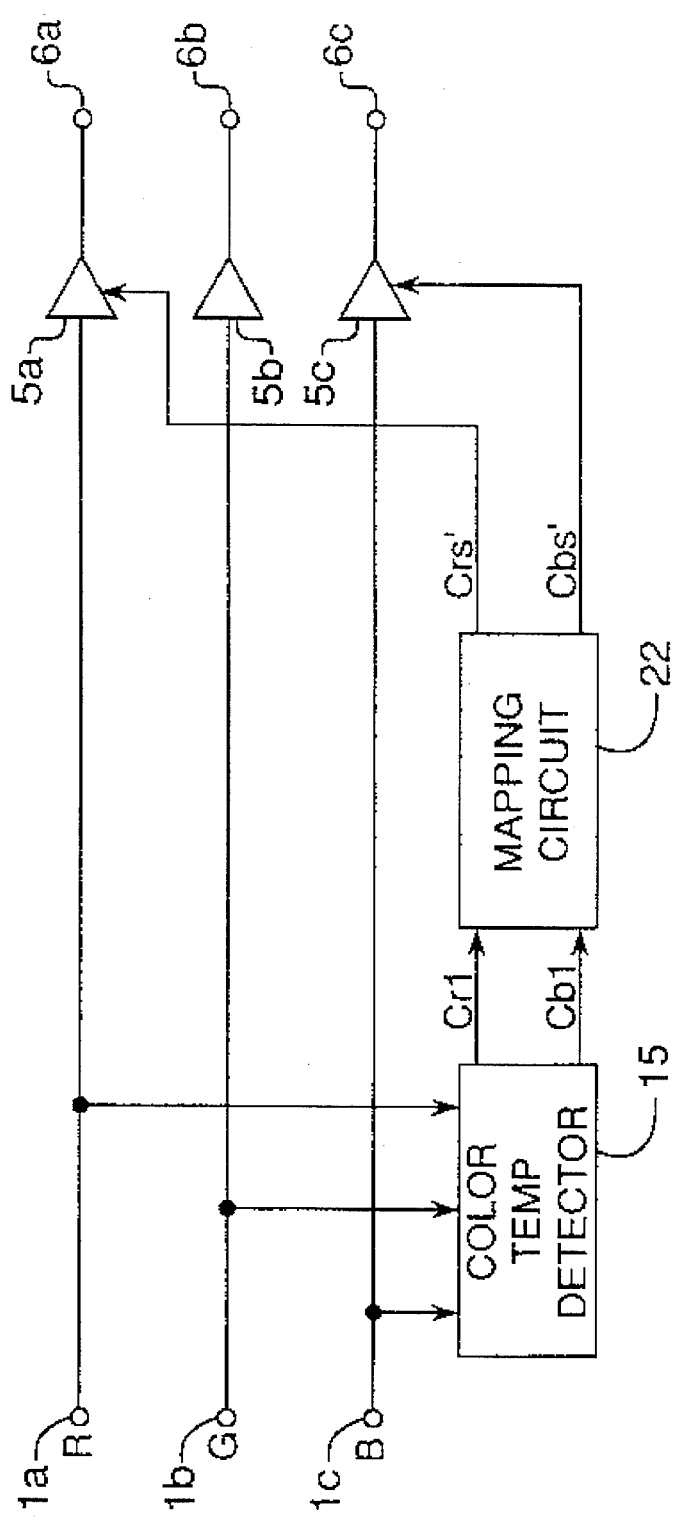
FIG. 16 is a block diagram of a white balance adjustment apparatus according to the fifth embodiment of the present invention.

FIG. 16 is a block diagram of a white balance adjustment apparatus according to the fifth embodiment of the invention. As shown in FIG. 16, the white balance adjustment apparatus comprises a color temperature detector 15 and mapping circuit 22.

The red (R), green (G), and blue (B) video signals input to input terminals 1a, 1b, and 1c are input to the color temperature detector 15, from which the color temperature information Cr1 and Cb1 are output. The structure and operation of the color temperature detector 15 are the same as that of the color temperature detector 15 in the second embodiment above, and further description is therefore omitted below. The color temperature information Cr1 and Cb1 are applied to the mapping circuit 22 for mapping and output as the color temperature information Crs', Cbs'. The method of mapping the color temperature information by the mapping circuit 22 is described below.

Figure 17:
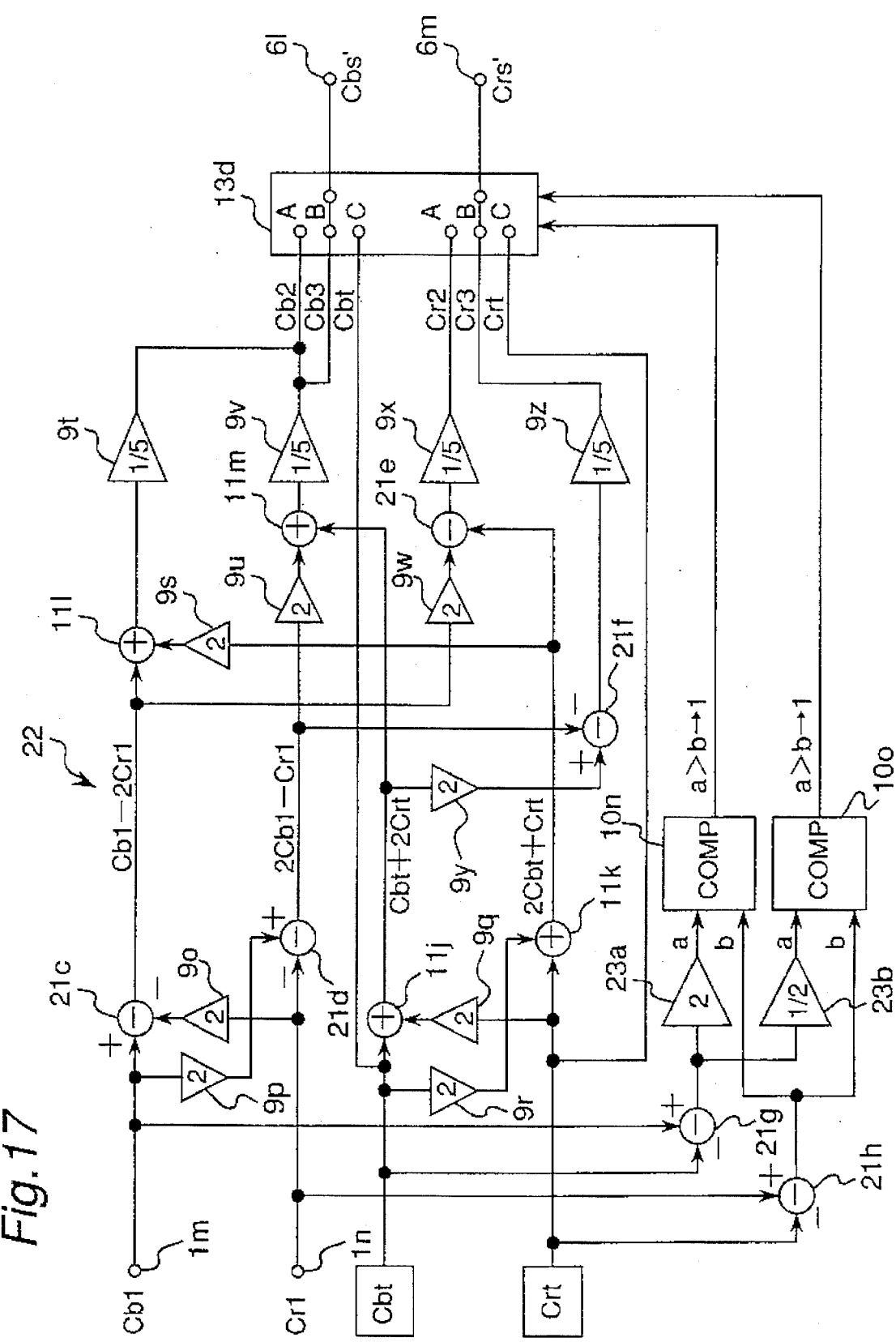
FIG. 17 is a block diagram of the mapping circuit of the white balance adjustment apparatus of the fifth embodiment of the present invention.

FIG. 17 is a block diagram of the mapping circuit 22 of the white balance adjustment apparatus according to the fifth embodiment of the invention.

Figure 18:
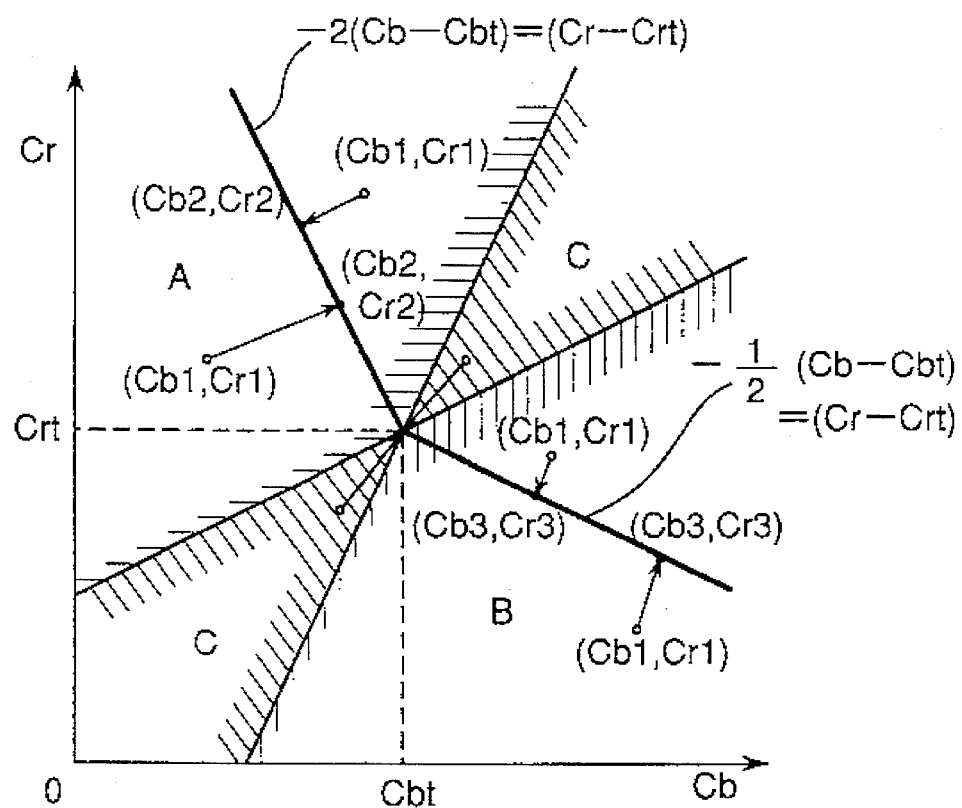
FIG. 18 is a color temperature coordinate space graph for the white balance adjustment apparatus of the fifth embodiment of the present invention.

Before describing the detail of the mapping circuit 22 shown in FIG. 17, its function is described first with reference to FIG. 18.

As shown in FIG. 18, Cb-Cr plotting area is divided into three ranges A, B and C by lines radially extending from a point (Cbt, Crt).

When the detected color temperature information (Cb1, Cr1) falls in range A, the color temperature information is changed to a point (Cb2, Cr2) which is on a line given by equation [8]

$$-2(Cb-Cbt)=(Cr-Crt) \qquad [8]$$

and a closest point from (Cb1, Cr1), i.e., a point perpendicularly impinging on the line of equation [8] from point (Cb1, Cr1).

When the detected color temperature information (Cb1, Cr1) falls in range B, the color temperature information is changed to a point (Cb3, Cr3) which is on a line given by equation [9]

$$-(Cb-Cbt)/2=(Cr-Crt) \qquad [9]$$

and a closest point from (Cb1, Cr1), i.e., a point perpendicularly impinging on the line of equation [9] from point (Cb1, Cr1).

When the detected color temperature information (Cb1, Cr1) falls in range C, the color temperature information is changed to the point (Cbt, Crt).

The mapping circuit 22 shown in FIG. 17 carries out the above function.

As shown in FIG. 17, the mapping circuit 22 comprises amplifiers 9o, 9p, 9q, 9r, 9s, 9t, 9u, 9v, 9w, 9x, 9y, 9z and 23a, 23b; adders 11j, 11k, 11l, 11m; subtractors 21c, 21d, 21e, 21f, 21g, 21h; comparators 10n, 10o; and a multiplexer 13d.

The color temperature information Cb1 input to the input terminal 1m is further input to the subtractor 21c together with the color temperature information Cr1 input to the input terminal 1n and amplified two times by amplifier 9o, and the difference (Cb1−2Cr1) is output from the subtractor 21c. Cb1 is also amplified two times by amplifier 9p and then input with Cr1 to subtractor 21d, which obtains and outputs difference signal (2Cb1−Cr1).

A constant value Cbt and a double of a constant value Crt, multiplied by two by amplifier $9q$, are input to the adder $11j$, which outputs the sum (Cbt+2Crt). Similarly, Cbt amplified two times by amplifier $9r$ and the value Crt are input to the adder $11k$, which outputs the sum (2Cbt+Crt).

The sum signal (2Cbt+Crt) output from the adder $11k$ is then doubled by amplifier $9s$, and input to adder $11l$ for addition to the difference signal (Cb1–2Cr1) output from the subtractor $21c$. The sum signal from the adder $11l$ is then multiplied ⅕-time by amplifier $9t$ to obtain output signal Cb2.

The difference signal (2Cb1–Cr1) output from subtractor $21d$ is doubled by amplifier $9u$ and then applied to the adder $11m$ for addition to the sum signal (Cbt+2Crt) output from the adder $11j$. The sum signal from the adder $11m$ is then multiplied ⅕-time by amplifier $9v$ to obtain output signal Cb3.

The difference signal (Cb1–2Cr1) output from subtractor $21c$ is doubled by amplifier $9w$ and then applied to the subtractor $21e$ for subtraction with the sum signal (2Cbt+Crt) output from the adder $11k$. The difference signal from the subtractor $21e$ is then multiplied ⅕-time by amplifier $9x$ to obtain output signal Cr2.

The sum signal (Cbt+2Crt) output from the adder $11j$ is doubled by amplifier $9y$ and then applied to the subtractor $21f$ for subtraction with the difference signal (2Cb1–Cr1) output from subtractor $21d$. The difference signal from the subtractor $21f$ is then multiplied ⅕-time by amplifier $9z$ to obtain output signal Cr3.

As a result, the values (Cb2, Cr2) and (Cb3, Cr3) are expressed as shown in equation [5] using the values (Cb1, Cr1) and (Cbt, Crt).

$$Cb2=\{(Cb1-Cr1)+2\,(2Cbt+Crt)\}/5$$

$$Cr2=\{-2\,(Cb1-2Cr1)+(2Cbt+Crt)\}/5$$

$$Cb3=\{2\,(2Cb1-Cr1)+(Cbt+2Crt)\}/5$$

$$Cr3=\{-(2Cb1-Cr1)+2\,(Cbt+2Crt)\}/5 \quad [5]$$

The subtractor $21g$ subtracts Cbt from Cb1, outputs the difference signal to amplifiers $23a$ and $23b$ for 2-times and ½-time amplification, respectively, and the products are input to the comparators $10n$ and $10o$.

The subtractor $21h$ subtracts Crt from Cr1, and outputs the difference signal directly to the comparators $10n$ and $10o$.

The comparator $10n$ outputs a HIGH signal when the output from amplifier $23a$ is greater than the output from subtractor $21h$, and otherwise outputs a LOW signal.

The comparator $10o$ outputs a HIGH signal when the output from amplifier $23b$ is greater than the output from subtractor $21h$, and otherwise outputs a LOW signal.

The multiplexer $13d$ selects (Cb2, Cr2) when the output from both comparators $10n$ and $10o$ is LOW; selects (Cb3, Cr3) when the output from both comparators $10n$ and $10o$ is HIGH; and selects (Cbt, Crt) at all other times. More specifically, the conditions for selection of (Cb2, Cr2) are defined by equation [6], and the conditions for selection of (Cb3, Cr3) are defined by equation [7].

$$(Cb1-Cbt)/2<(Cr1-Crt)$$

$$(Cb1-Cbt)\times2<(Cr1-Crt) \quad [6]$$

$$(Cb1-Cbt)/2>(Cr1-Crt)$$

$$(Cb1-Cbt)\times2>(Cr1-Crt) \quad [7]$$

The conditions for selection of (Cb2, Cr2) (equation 6) are satisfied when (Cb1, Cr1) is within region A in the color temperature coordinate space shown in FIG. 18; the conditions for selection of (Cb3, Cr3) (equation 7) are satisfied when (Cb1, Cr1) is within region B; and the conditions for selection of (Cbt, Crt) are satisfied when (Cb1, Cr1) is within region C. Note that color temperature information Cb is on the axis of abscissas, Cr is on the axis of ordinates, and the solid line is the axis of color temperature change.

The final signals Cbs, Crs output from the output terminals $6l$ and $6m$ of the multiplexer $13d$ are obtained by mapping (Cb1, Cr1) perpendicularly to the axis of color temperature change approximated by equation [8] when (Cb1, Cr1) are within region A; mapping (Cb1, Cr1) perpendicularly to the axis of color temperature change approximated by equation [9] when (Cb1, Cr1) are within region B; and mapping (Cb1, Cr1) to (Cbt, Crt) when (Cb1, Cr1) are within region C.

$$-2(Cb-Cbt)=(Cr-Crt) \quad [8]$$

$$-(Cb-Cbt)/2=(Cr-Crt) \quad [9]$$

Thus, (Cbs, Crs) output from the mapping circuit 22 is input to the white balance gain calculator 4, which calculates the white balance gain to adjust the gain of amplifiers $5a$ and $5c$, and thus output white-balanced video signals from output terminals $6a$, $6b$, and $6c$.

The color temperature information detected by the color temperature detector may deviate from the axis of color temperature change depending on the color of the subject.

The effect of the present embodiment is to obtain high precision white balance control by mapping the detected color temperature information to the axis of color temperature change by a mapping conversion.

In summary, the selection of terminals A, B, C in multiplexer $13d$ (terminals A, B, C correspond to ranges A, B, C in FIG. 18) is accomplished by the combination of outputs from comparators $10n$ and $10o$ as given by Table 1 below.

TABLE 1

| 10n | 10o | Range |
|---|---|---|
| 0 | 0 | A |
| 0 | 1 | C |
| 1 | 0 | C |
| 1 | 1 | B |

A sixth embodiment of a white balance adjustment apparatus according to the present invention is described below with reference to the accompanying figures. The object of the sixth embodiment is to obtain higher precision white balance control by mapping to the axis of color temperature change by a mapping conversion the color temperature information detected by the color temperature detector. More specifically, fading of green colors exposed to outdoor lighting is prevented by mapping to the blue side of the axis of color temperature change when the detected color temperature information is weighted towards the green side of the axis of color temperature change.

The sixth embodiment has a mapping circuit 22' which is a modification of the mapping circuit 22 of the white balance adjustment apparatus according to the fifth embodiment of the invention. As other aspects of the operation of the sixth embodiment are the same as in the fifth embodiment, only the operation of the mapping circuit 22 is described below.

Figure 19:
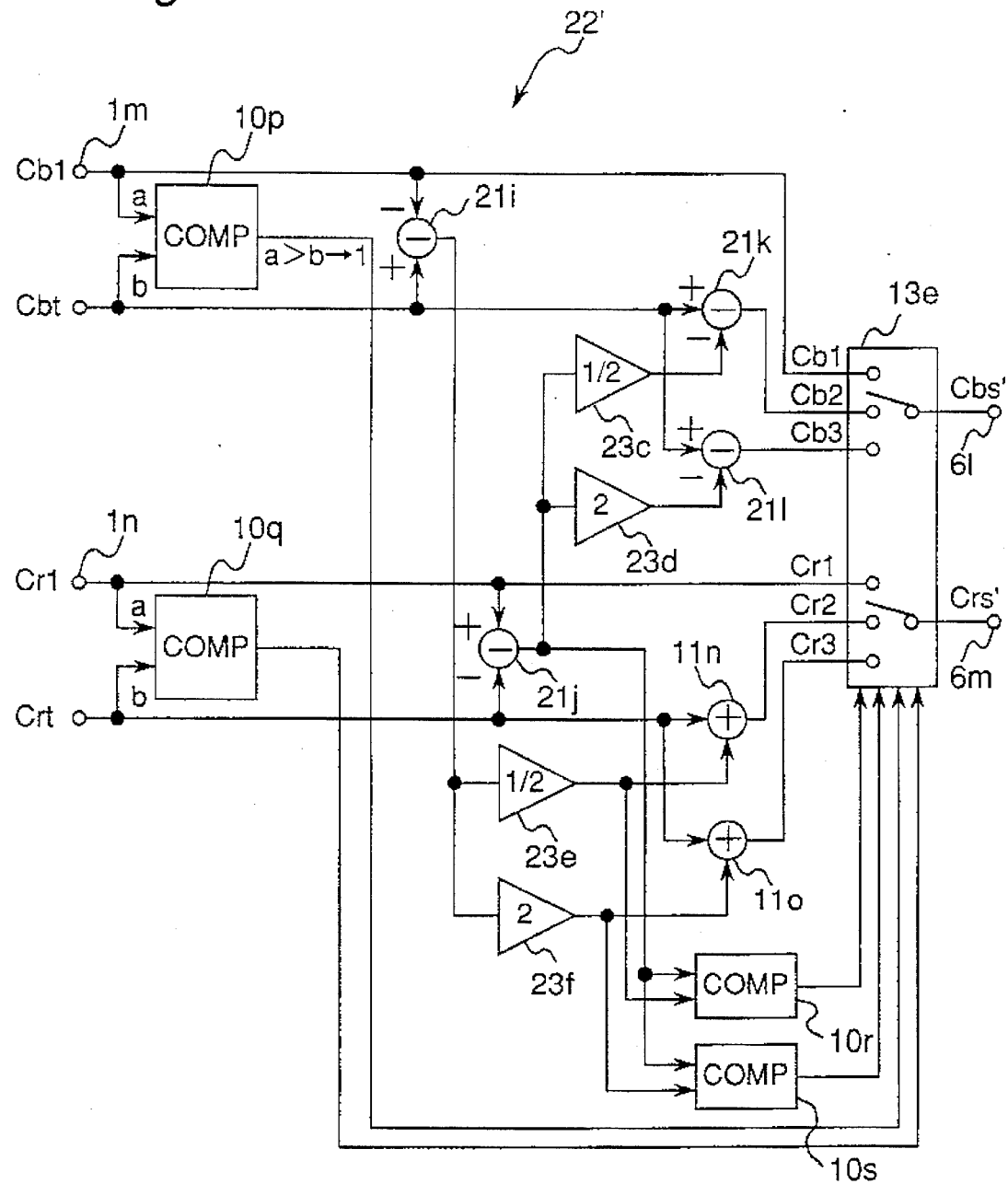
FIG. 19 is a block diagram of the mapping circuit of the white balance adjustment apparatus of the sixth embodiment of the present invention.
Figure 20:
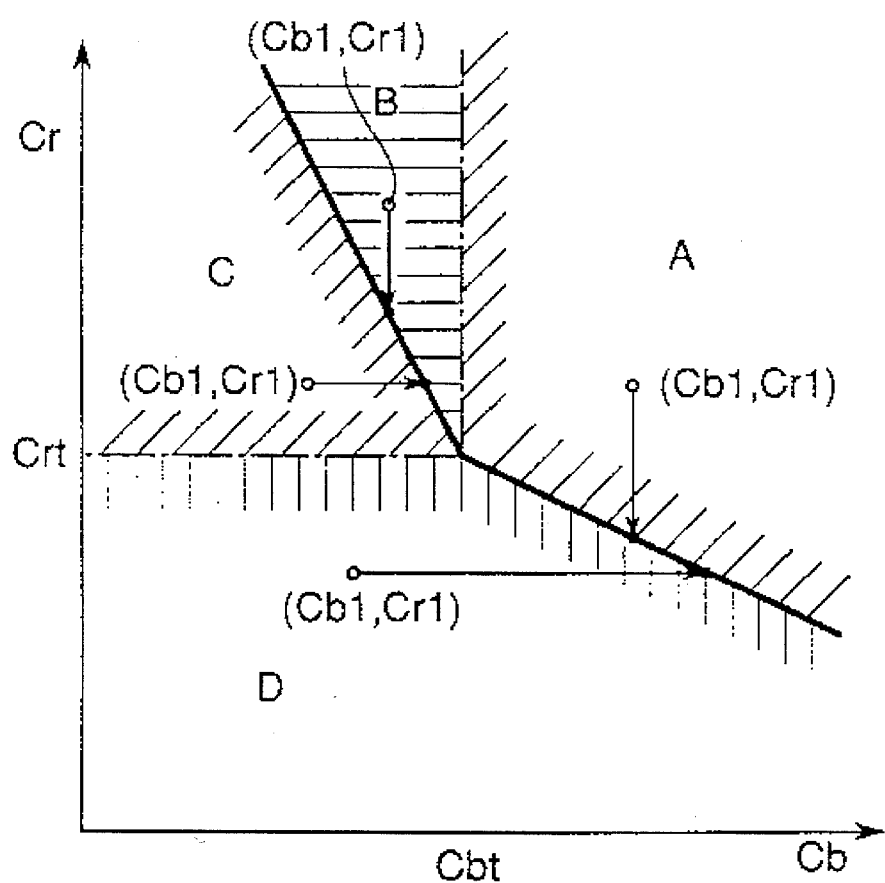
FIG. 20 is a color temperature coordinate space graph for the white balance adjustment apparatus of the sixth embodiment of the present invention.

Before describing the detail of the mapping circuit 22' shown in FIG. 19, its function is described first with reference to FIG. 20.

As shown in FIG. 20, Cb-Cr plotting area is divided into four ranges A, B, C and D by lines vertically and horizontally extending from a point (Cbt, Crt).

When the detected color temperature information (Cb1, Cr1) falls in range A, the color temperature information is changed to a point which is on a line given by equation [9]

$$-(Cb-Cbt)/2=(Cr-Crt) \qquad [9]$$

and at an intersecting point with a line that extends parallel to the axis of ordinates from (Cb1, Cr1), i.e., a point vertically impinging on the line of equation [8] from point (Cb1, Cr1).

When the detected color temperature information (Cb1, Cr1) falls in range B, the color temperature information is changed to a point which is on a line given by equation [8]

$$-2(Cb-Cbt)=(Cr-Crt) \qquad [8]$$

and at an intersecting point with a line that extends parallel to the axis of ordinates from (Cb1, Cr1), i.e., a point vertically impinging on the line of equation [8] from point (Cb1, Cr1).

When the detected color temperature information (Cb1, Cr1) falls in range C, the color temperature information is changed to a point which is on a line given by equation [8]

$$-2(Cb-Cbt)=(Cr-Crt) \qquad [8]$$

and at an intersecting point with a line that extends parallel to the axis of abscissas from (Cb1, Cr1), i.e., a point horizontally impinging on the line of equation [8] from point (Cb1, Cr1).

When the detected color temperature information (Cb1, Cr1) falls in range D, the color temperature information is changed to a point which is on a line given by equation [9]

$$-(Cb-Cbt)/2=(Cr-Crt) \qquad [9]$$

and at an intersecting point with a line that extends parallel to the axis of abscissas from (Cb1, Cr1), i.e., a point horizontally impinging on the line of equation [9] from point (Cb1, Cr1).

In general terms, the mapping according to this embodiment is effected by extending in vertical direction parallel to an ordinate axis for the color temperature signal having a bluish characteristics (in regions A and B), and extending in horizontal direction parallel to an abscissa axis for the color temperature signal having a greenish characteristics (in regions C and D).

FIG. 19 is a block diagram of the mapping circuit of the white balance adjustment apparatus according to the sixth embodiment of the invention. As shown in FIG. 19, this mapping circuit 22 comprises comparators $10p$, $10q$; subtractors $21i$, $21j$, $21k$, $21l$; adders $11n$, $11o$; amplifiers $23c$, $23d$, $23e$, $23f$; and a multiplexer $13e$.

The difference between Cb1 input to input terminal $1m$ and Cbt is obtained by subtractor $21i$, and the difference signal is input to amplifiers $23e$ and $23f$ for amplifying ½-time and 2-times, respectively.

The difference between Cr1 input to input terminal $1n$ and Crt is obtained by subtractor $21j$, and the difference signal is input to amplifiers $23c$ and $23d$ for amplifying ½-time and 2-times, respectively.

The output of amplifier $23c$ is subtracted from Cbt by subtractor $21k$, and output as Cb2.

The output of amplifier $23d$ is subtracted from Crt by subtractor $21l$, and output as Cb3.

The output of amplifier $23e$ is added to Crt by adder $11n$, and output as Cr2.

The output of amplifier $23f$ is added to Crt by adder $11o$, and output as Cr3.

The values Cb2, Cb3, Cr2, and Cr3 are thus defined by equation [10] below.

$$Cb2=-(Cr1-Crt)/2+Cbt$$

$$Cb3=-2(Cr1-Crt)+Cbt$$

$$Cr2=-(Cb1-Cbt)/2+Crt$$

$$Cr3=-2(Cb1-Cbt)+Crt \qquad [10]$$

The output of amplifier $23f$ is subtracted from Crt by the subtractor $21l$, and output therefrom as Cr3. Cb1 is next input with Cbt to the comparator $10p$, which outputs a HIGH signal when Cb1 is greater and outputs a LOW signal otherwise.

Cr1 is input with Crt to the comparator $10q$, which outputs a HIGH signal when Cr1 is greater and outputs a LOW signal otherwise.

The output of the subtractor $21j$ is input with the output of the amplifier $23e$ to the comparator $10r$, which outputs a HIGH signal when the output of subtractor $21j$ is greater and outputs a LOW signal otherwise.

The output of the subtractor $21j$ is also input with the output of the amplifier $23f$ to the comparator $10s$, which outputs a HIGH signal when the output of subtractor $21j$ is greater and outputs a LOW signal otherwise.

The multiplexer $13e$ selects Cb1 and Cr2 when the output of both comparators $10p$ and $10r$ is HIGH, and outputs Cb1 and Cr2 as (Cbs, Crs) from output terminals $6l$ and $6m$. The condition for this to occur is shown in equation [11], and occurs when (Cb1, Cr1) is within region A in the color temperature coordinate space shown in FIG. 20. When (Cb1, Cr1) is within region A in FIG. 20, the mapping circuit 22 maps (Cb1, Cr1) parallel to the Cr axis to the axis of color temperature change, and outputs the resulting value as (Cbs, Crs). Note that in FIG. 20 color temperature information Cb is on the axis of abscissas, Cr is on the axis of ordinates, the solid line is the axis of color temperature change, 0 represents the detected color temperature information (Cb1, Cr1), and ● represents the color temperature information (Cbs, Crs) after mapping.

$$(Cr1-Crt)>-(Cb1-Cbt)/2$$

$$Cb1>Cbt \qquad [11]$$

The multiplexer $13e$ selects Cb1 and Cr3 for output as (Cbs, Crs) from the output terminals $6l$ and $6m$ when the outputs of comparators $10p$ and $10s$ are LOW and HIGH, respectively. The condition for this selection is shown in equation [12], and occurs when (Cb1, Cr1) is within region B in FIG. 20. When (Cb1, Cr1) is within region B in FIG. 20, the mapping circuit 22 again maps (Cb1, Cr1) parallel to the Cr axis to the axis of color temperature change, and outputs the resulting value as (Cbs, Crs).

$$(Cr1-Crt)>-2(Cb1-Cbt)$$

$$Cb1<Cbt \qquad [12]$$

The multiplexer $13e$ selects Cb2 and Cr1 for output as (Cbs, Crs) from the output terminals $6l$ and $6m$ when the outputs of comparators $10q$ and $10s$ are HIGH and LOW, respectively. The condition for this selection is shown in equation [13], and occurs when (Cb1, Cr1) is within region C in the color temperature coordinate space in FIG. 20. When (Cb1, Cr1) is within region C in FIG. 20, the mapping circuit 22 maps (Cb1, Cr1) parallel to the Cb axis to the axis of color temperature change, and outputs the resulting value as (Cbs, Crs).

$$(Cr1-Crt) < -2(Cb1-Cbt)$$

$$Cr1 > Crt \quad [13]$$

The multiplexer 13e selects Cb3 and Cr1 for output as (Cbs, Crs) from the output terminals 6l and 6m when the outputs of comparators 10q and 10r are both LOW. The condition for this selection is shown in equation [14], and occurs when (Cb1, Cr1) is within region D in the color temperature coordinate space in FIG. 20. When (Cb1, Cr1) is within region D in FIG. 20, the mapping circuit 22 again maps (Cb1, Cr1) parallel to the Cb axis to the axis of color temperature change, and outputs the resulting value as (Cbs, Crs).

$$(Cr1-Crt) < -(Cb1-Cbt)/2$$

$$Cr1 > Crt \quad [14]$$

The (Cbs, Crs) value output from the mapping circuit 22 is thus input to the white balance gain calculator 4, which calculates the white balance gain to adjust the gain of amplifiers 5a and 5c, and thus output white-balanced video signals from output terminals 6a, 6b, and 6c.

The color temperature information detected by the color temperature detector may deviate from the axis of color temperature change depending on the color of the subject.

The effect of the present embodiment is to obtain high precision white balance control by mapping the detected color temperature information to the axis of color temperature change by a mapping conversion. There is a particular tendency when recording outdoors for the detected color temperature to be biased to the low temperature side because of the relatively large quantity of green and yellow subjects outdoors. By appropriately mapping the color temperature information as described in the present embodiment, however, the white balance can be adjusted with high precision even when recording outdoors.

In summary, the selection of one terminal from terminals Cb1, Cb2, Cb3, and one terminal from terminals Cr1, Cr2, Cr3 in multiplexer 13e is accomplished by the combination of outputs from comparators 10p, 10q, 10r, 10s as given by Table 2 below.

TABLE 2

| 10p | 10q | 10r | 10s | Cr1 | Cr2 | Cr3 | Cb1 | Cb2 | Cb3 | Range |
|---|---|---|---|---|---|---|---|---|---|---|
| 1 | 1 | 1 | 1 | — | o | — | o | — | — | A |
| 1 | 0 | 1 | 1 | — | o | — | o | — | — | A |
| 0 | 1 | 1 | 1 | — | — | o | o | — | — | B |
| 0 | 1 | 0 | 0 | — | — | o | — | o | — | C |
| 0 | 1 | 1 | 0 | — | — | o | — | o | — | C |
| 0 | 0 | 0 | 0 | o | — | — | — | — | o | D |
| 1 | 0 | 0 | 0 | o | — | — | — | — | o | D |
| 1 | 0 | 0 | 1 | o | — | — | — | — | o | D |

Note: o indicates the selected terminal.

A seventh embodiment of a white balance adjustment apparatus according to the present invention is described below with reference to the accompanying figures.

It is commonly accepted that achromatic color can be obtained by averaging the colors of various subjects, but when recording outdoors, there is generally a predominance of low color temperature subject matter such as greens and yellows within the viewing area. The object of this seventh embodiment is therefore to obtain higher precision white balance control by applying an offset value, particularly when outdoors, to the color temperature information detected by the color temperature detector.

Figure 21:
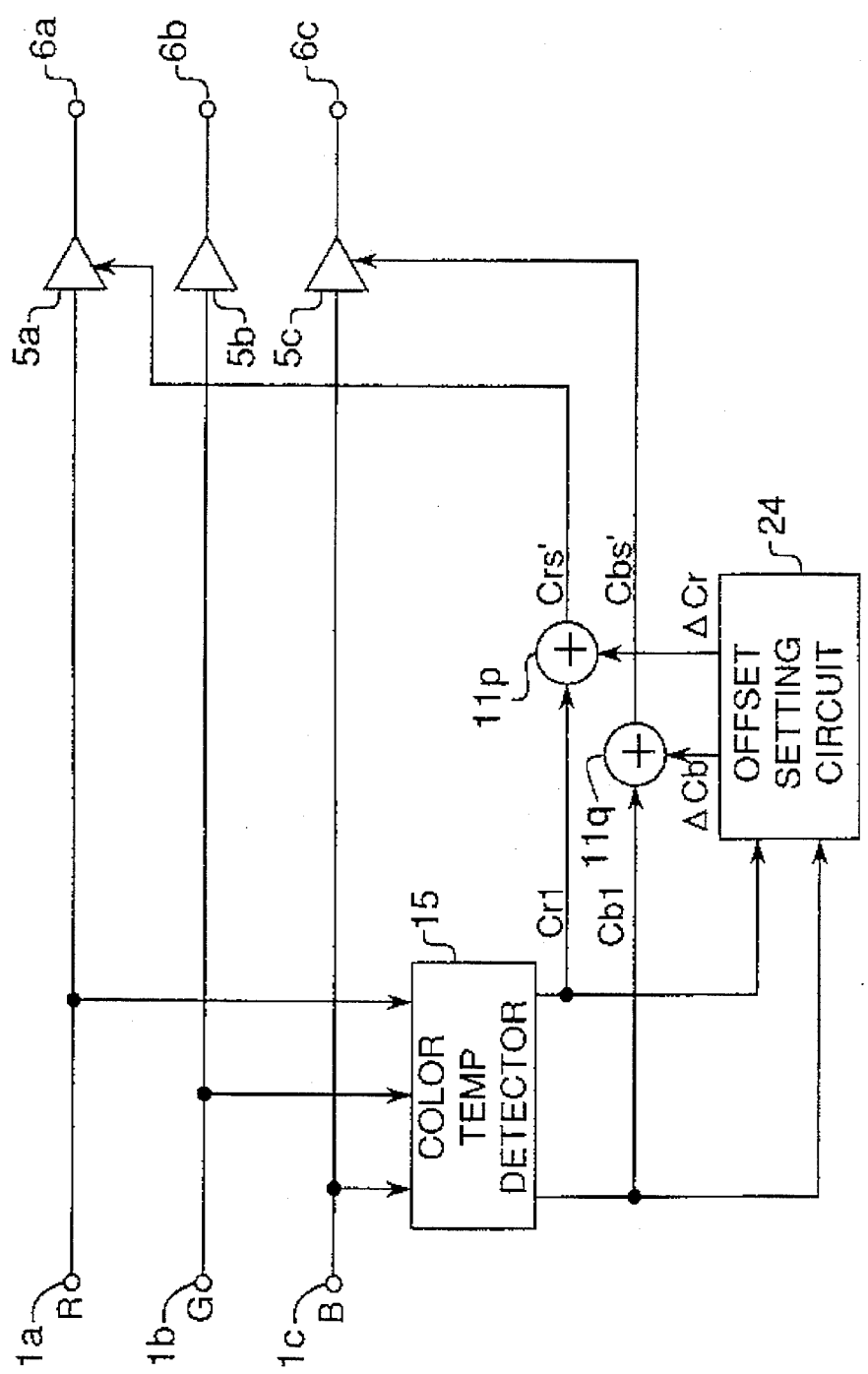
FIG. 21 is a block diagram of a white balance adjustment apparatus according to the seventh embodiment of the present invention.

FIG. 21 is a block diagram of the seventh embodiment of a white balance adjustment apparatus according to the invention. As shown in FIG. 21, this white balance adjustment apparatus comprises a color temperature detector 15, an offset setting circuit 24, adders 11p, 11q, and amplifiers 5a, 5b, 5c.

The red (R), green (G), and blue (B) video signals input to input terminals 1a, 1b, and 1c are input to the color temperature detector 15, from which the color temperature information Cr1, Cb1 is output. The operation of the color temperature detector 15 is the same as that of the color temperature detector 15 in the second embodiment above, and further description is therefore omitted below. The color temperature information Cr1, Cb1 is output from the color temperature detector 15 to the adders 11p and 11q and to the offset setting circuit 24.

The offset setting circuit 24 determines the offset value ($\Delta$Cb, $\Delta$Cr) according to the color temperature information input thereto. The operation of the offset setting circuit 24 is described in detail below with reference to FIG. 22.

Figure 22:
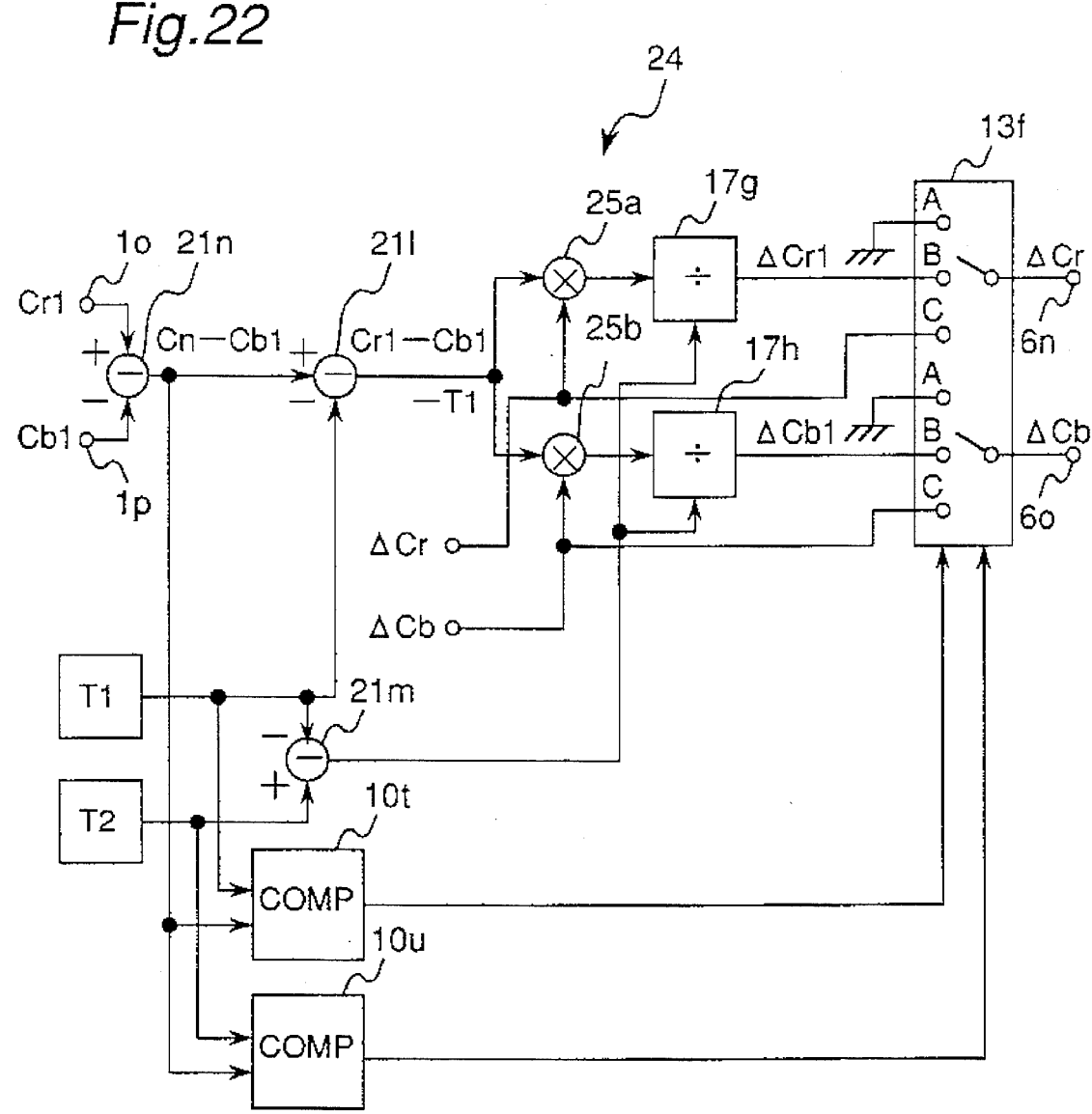
FIG. 22 is a block diagram of the offset setting circuit in the seventh embodiment of the present invention.
Figure 23:
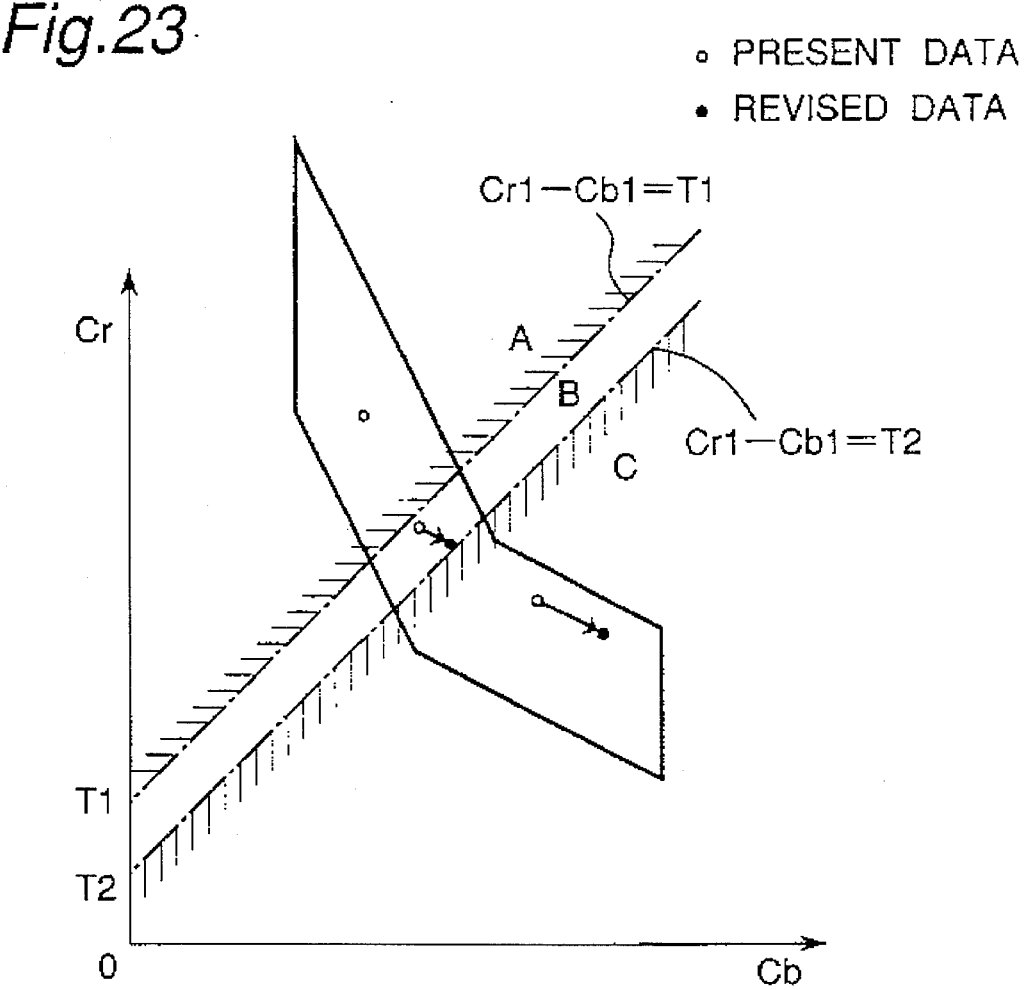
FIG. 23 is a color temperature coordinate space graph showing the relationship between Cr1, Cb1 and Or, Cb in the seventh embodiment of the present invention.

Before describing the detail of the mapping circuit 24 shown in FIG. 22, its function is described first with reference to FIG. 23.

As shown in FIG. 23, Cb-Cr plotting area is divided into four ranges A, B and C by lines Cr1-Cb1=T1 and Cr1-Cb1=T2.

When the detected color temperature information falls in range A, the color temperature information (Cb1, Cr1) is not moved; in range B, the color temperature information (Cb1, Cr1) is moved by ($\Delta$Cb1, $\Delta$Cr1); and in range C, the color temperature information (Cb1, Cr1) is moved by ($\Delta$Cb, $\Delta$Cr).

As shown in FIG. 22, the offset setting circuit 24 comprises subtractors 21l, 21m, 21n, comparators 10t, 10u, multipliers 25a, 25b, dividers 17g, 17h, and a multiplexer 13f.

The color temperature information Cb1, Cr1 input to the input terminals 1o and 1p are subtracted by the subtractor 21n, and the difference signal (Cr1-Cb1) is output to the subtractor 21l and comparators 10t and 10u.

A constant T1 is also input to the subtractor 21l, which outputs the difference signal (Cr1-Cb1-T1). The output from the subtractor 21l is multiplied by offset values $\Delta$Cr0 and $\Delta$Cb0 by multipliers 25a and 25b, respectively, and the products are output to the dividers 17g and 17h.

The subtractor 21m obtains the difference between constants T1 and T2, and applies the result to the dividers 17g and 17h.

The divider 17g divides the output of the corresponding multiplier 25a by the constants difference output from the subtractor 21m, and outputs the result as $\Delta$Cr1. Similarly, the other divider 17h divides the output of the corresponding multiplier 25b by the difference output from the subtractor 21m, and outputs the result as ΔCb1.

The quotients output from the dividers 17g and 17h are thus defined by equation [15] below.

$$\Delta Cr1 = \Delta Cr0 \ (Cr1-Cb1-T1)/(T2-T1)$$

$$\Delta Cb1 = \Delta Cb0 \ (Cr1-Cb1-T1)/(T2-T1) \qquad [15]$$

The first comparator 10t compares the output (Cr1-Cb1) from the subtractor 21n with T1, outputs a HIGH signal when T1 is greater, and otherwise outputs a LOW signal.

The other comparator 10u compares the output (Cr1-Cb1) from the subtractor 21n with T2, outputs a HIGH signal when T2 is greater, and otherwise outputs a LOW signal.

The multiplexer 13f selects (ΔCb0, ΔCr0) when the output of comparator 10u is HIGH; selects (ΔCb1, ΔCr1) when the output of comparator 10u is LOW and the output of comparator 10t is HIGH; selects 0 when the output from both comparators 10t and 10u is LOW; and outputs the selected signals from output terminals 6n and 6o as (ΔCb, ΔCr).

In summary, the selection of terminals A, B, C in multiplexer 13f (terminals A, B, C correspond to ranges A, B, C in FIG. 23) is accomplished by the combination of outputs from comparators 10t and 10u as given by Table 3 below.

TABLE 3

| 10t | 10u | Range |
|---|---|---|
| 0 | 0 | A |
| 0 | 1 | B |
| 1 | 0 | B |
| 1 | 1 | C |

The multiplexer 13f thus selects 0 in range A in the color temperature coordinate space shown in FIG. 23; selects (ΔCb1, ΔCr1) when in range B; selects (ΔCb0, ΔCr0) when in range C; and outputs the selected values as (ΔCb, ΔCr). Note that color temperature information Cb is on the axis of abscissas, and Cr is on the axis of ordinates.

The adders 11p and 11q in FIG. 21 then add the Cb1 and Cr1 outputs from the color temperature detector 15 with the corresponding outputs ΔCb and ΔCr from the offset setting circuit 24, and apply the resulting sum signals Cbs' and Crs' to the amplifiers 5a and 5c, respectively.

The relationship between (Cb1, Cr1) and (Cbs, Crs) is shown in FIG. 23. In range A, an offset value of 0 is added for color temperatures Cb1 and Cr1 indicated by 0, and Cbs and Crs therefore have the same coordinates. In range B, however, a value (ΔCb1, ΔCr1), which is a value between 0 and (ΔCb0, ΔCr0), is added to the color temperature coordinates (Cb1, Cr1). In range C, offset value (ΔCb0, ΔCr0) is added to the color temperature coordinates (Cb1, Cr1), so that in the latter two cases, the data changes from the point indicated by ○ to the point indicated by ●.

When the color temperature information is detected in the white detection area, there may be color fading with green or yellow subjects exposed to outdoor light.

The effect of the present embodiment is to obtain high precision white balance control by referencing the detected color temperature information to use a small offset value when the color temperature is low, and to increase the offset value when the color temperature is high as occurs in outdoor scenes containing greens and yellows.

An eighth embodiment of a white balance adjustment apparatus according to the present invention is described below with reference to the accompanying figures.

As stated above, it is commonly accepted that achromatic color can be obtained by averaging the colors of various subjects, but when recording outdoors, there is generally a predominance of low color temperature subject matter such as greens and yellows within the viewing area. The object of this eighth embodiment is therefore to obtain high precision white balance control by detecting green in the subject to hold the current white balance adjustment when the image being currently recorded is determined to be green.

Figure 24:
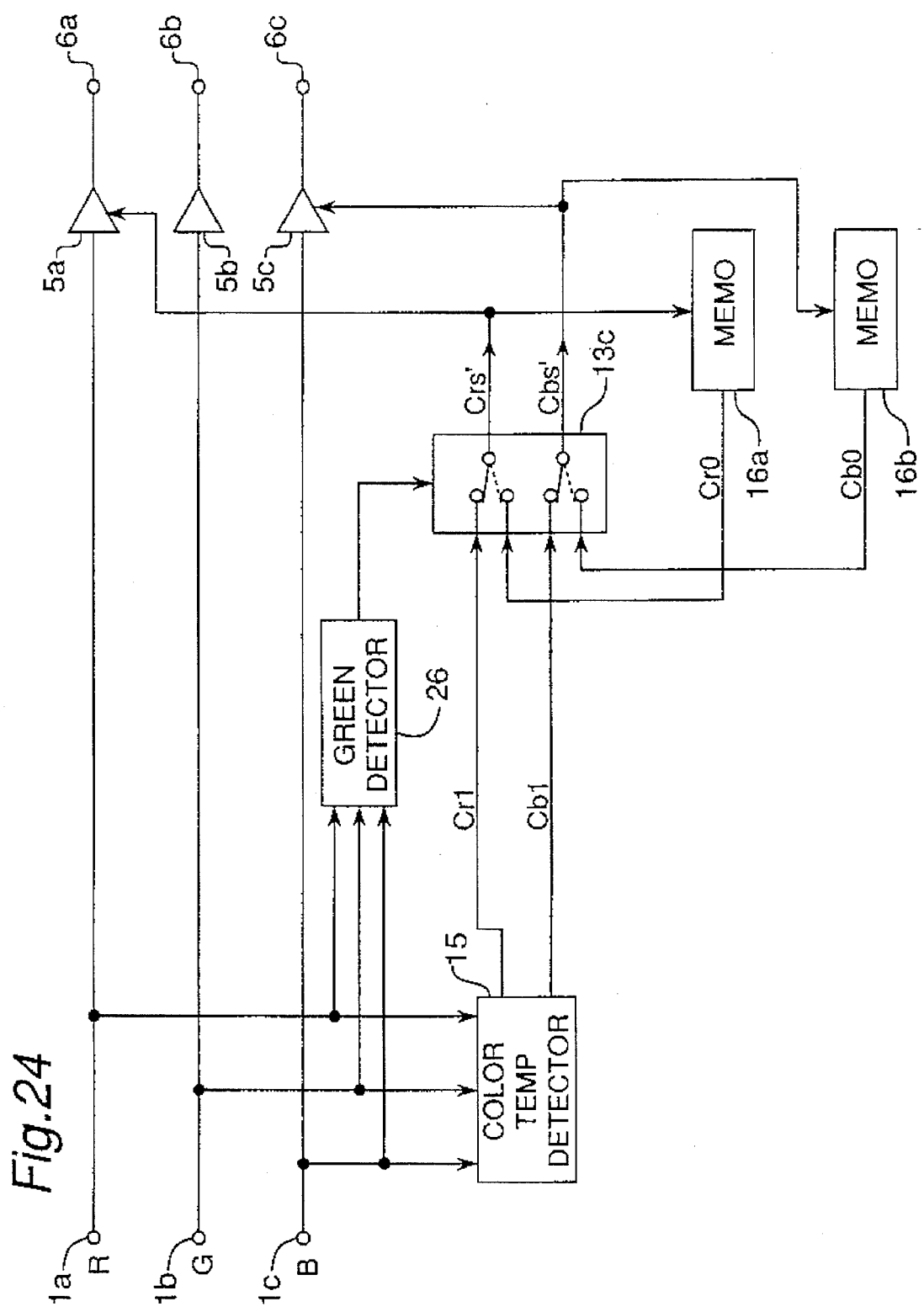
FIG. 24 is a block diagram of a white balance adjustment apparatus according to the eighth embodiment of the present invention.

FIG. 24 is a block diagram of the eighth embodiment of a white balance adjustment apparatus according to the invention. As shown in FIG. 24, this white balance adjustment apparatus comprises a color temperature detector 15, a green detector 26, a multiplexer 13c, a white balance gain calculator 4, a memory 16, and amplifier 5.

The red (R), green (G), and blue (B) video signals input to input terminals 1a, 1b, and 1c are input to the color temperature detector 15, from which the color temperature information Cr1, Cb1 is output. The operation of the color temperature detector 15 is the same as that of the color temperature detector 15 in the second embodiment above, and further description is therefore omitted below. The RGB video signals are also input to the green detector 26. The green detector 26 detects green characteristics in one field data, i.e., whether there are many green-colored pixels contained in one field data, outputs a HIGH signal if there is a high green percentage, and outputs a LOW signal otherwise.

Figure 25:
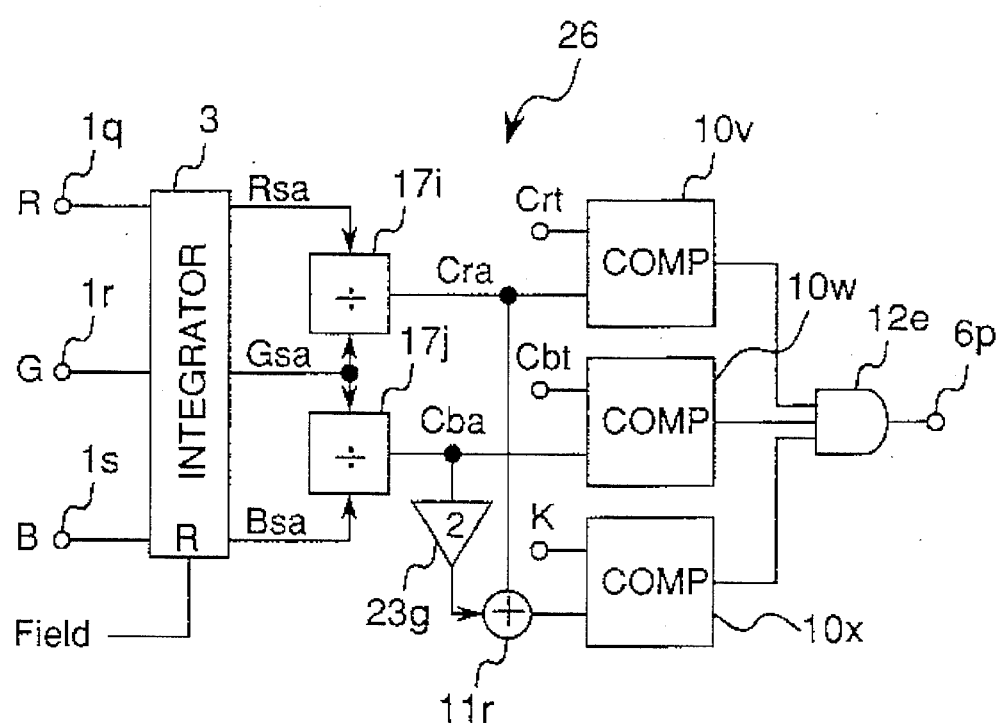
FIG. 25 is a block diagram of the green detector in the eighth embodiment of the present invention.
Figure 26:
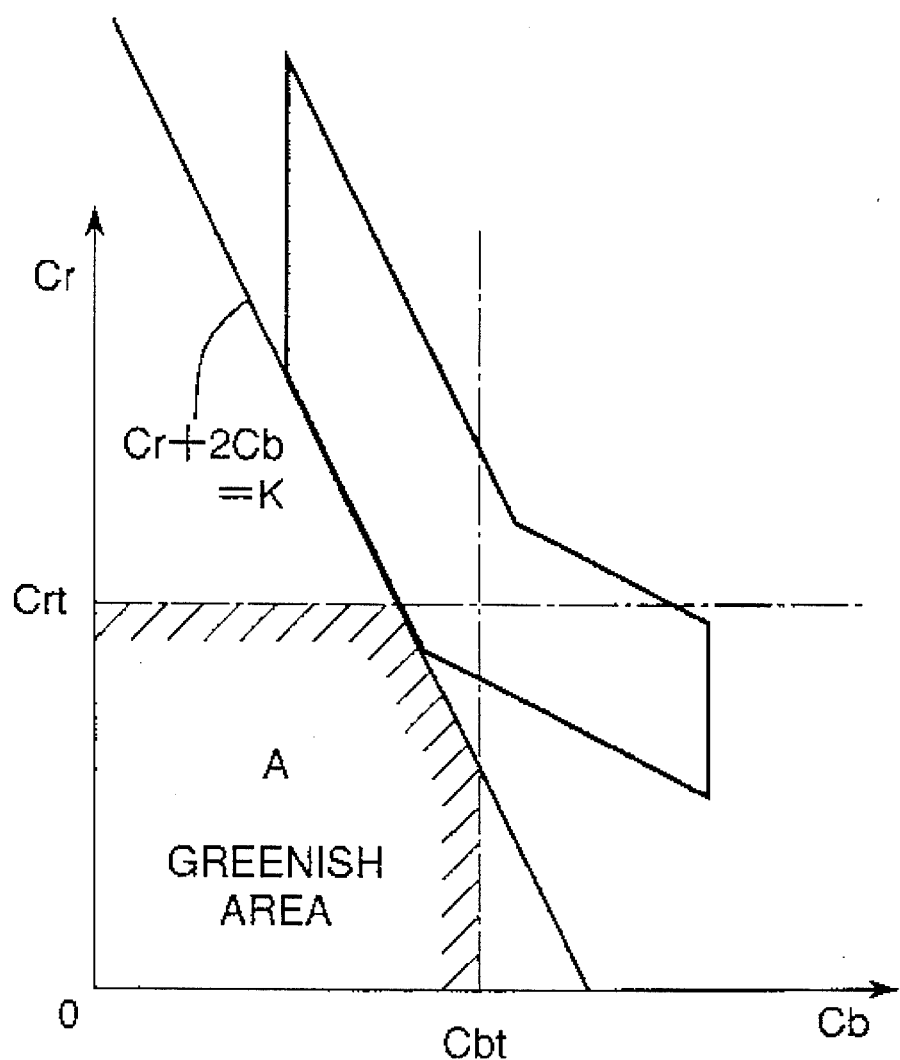
FIG. 26 is a color temperature coordinate space graph for the white balance adjustment apparatus of the eighth embodiment of the present invention.

Before describing the detail of the green detector 26 shown in FIG. 25, its function is described first with reference to FIG. 26.

As shown in FIG. 26, Cb-Cr plotting area is has a range A, representing a greenish area. The green detector 26 detects whether the detected color temperature information (Cb1, Cr1) falls in range A, or not.

When the detected color temperature information (Cb1, Cr1) falls in range A, the multiplexer 13c is switched to the dotted line so that the data stored in memories 16a and 16b are selected. When the detected color temperature information (Cb1, Cr1) falls outside range A, the multiplexer 13c is switched to the real line so that the newly obtained data are selected.

The green detector 26 is described in detail below with reference to FIG. 25. As shown in FIG. 25, the green detector 26 comprises an integrator 3, dividers 17i, 17j, an amplifier 23g, an adder 11r, comparators 10v, 10w and 10x, and an AND circuit 12e.

The R, G, and B video signals input to the input terminals 1q, 1r, and 1s are integrated for one field by the integrator 3, which then outputs the integrated values Rsa, Gsa, and Bsa. The first divider 17i divides Rsa by Gsa, and outputs Cra; the other divider 17j divides Bsa by Gsa and outputs Cba. Cra and a constant Crt are input to the first comparator 10v, which outputs a HIGH signal when Crt is greater, and otherwise outputs a LOW signal. Cba and a constant Cbt are input to the other comparator 10w, which outputs a HIGH signal when Cbt is greater, and otherwise outputs a LOW signal. Cba output from the second divider 17j is doubled by the amplifier 23g, and the amplified Cba is input with Cra to the adder 11r, which then outputs the sum signal (Cra+2Cba). The third comparator 10x compares the output signal from the adder 11r with a constant value K=Cr+2Cb, outputs a HIGH signal when K is greater, and otherwise outputs a LOW signal.

The AND circuit 12e outputs a HIGH signal when the output from each of the comparators 10v, 10w, and 10x is HIGH, but otherwise outputs a LOW signal as the green detection signal from output terminal 6p.

The green detection signal thus obtained is output HIGH when the averaged value (Cba, Cra) of the color information for the entire field is within range A in the color temperature coordinate space shown in FIG. 26. Note that color temperature information Cb is on the axis of abscissas, and Cr is on the axis of ordinates in FIG. 26.

When the output signal from the green detector 26 is HIGH, the multiplexer 13c (FIG. 24) selects the color temperature information (Cb0, Cr0) used for the current white balance control and stored in memory 16; when the green detector output is LOW, the output signals (Cb1, Cr1) from the color temperature detector 15 are selected. The selected color temperature information are applied to amplifiers 5a and 5c.

While subjects of low color temperature colors such as green and yellow are abundant when recording outdoors, the green detector of the present embodiment determines when there is a green bias to the average color of the entire field, and can thus detect that the overall color of the scene currently being recorded is biased to green. By holding the white balance adjustment used to that point when the current scene is determined to be green, the present embodiment can maintain high precision white balance control.

A ninth embodiment of a white balance adjustment apparatus according to the present invention is described below with reference to the accompanying figures. The object of this ninth embodiment is to avoid fading of green colors when outdoors and to obtain high precision white balance control by applying an offset value to the color temperature information when green is detected by the green detector of the embodiment.

Figure 27:
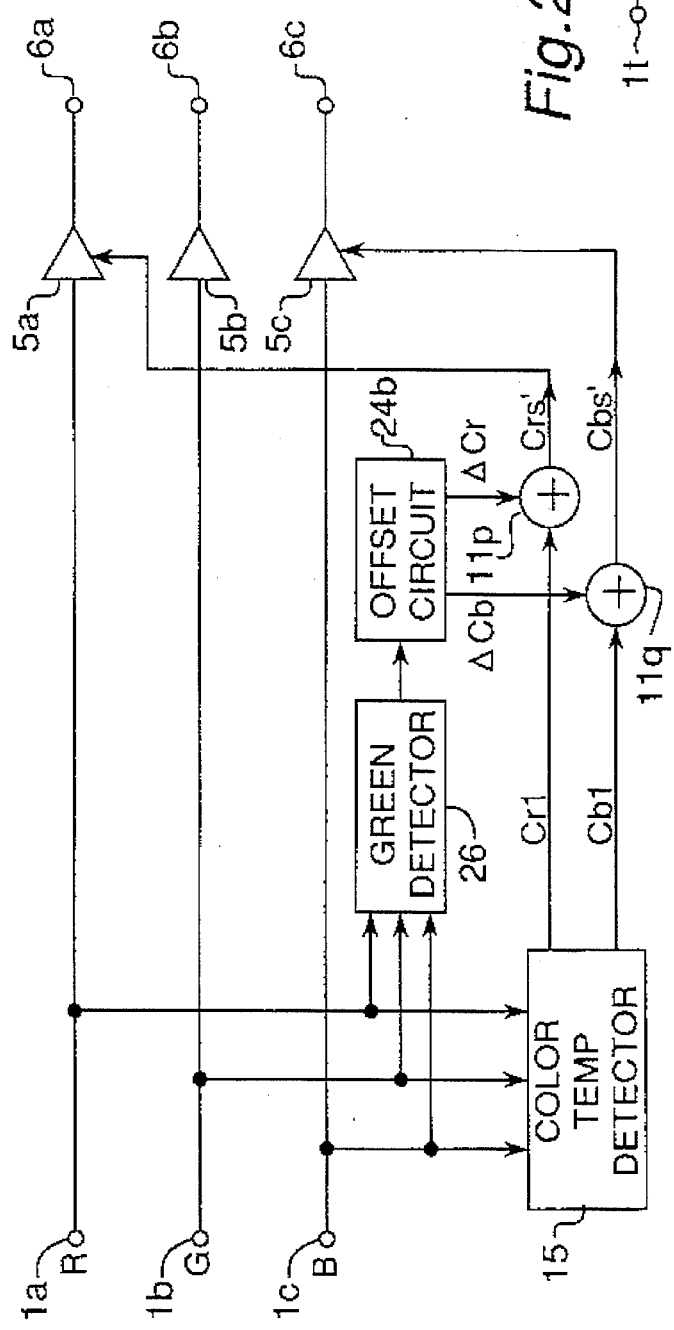
FIG. 27 is a block diagram of a white balance adjustment apparatus according to the ninth embodiment of the present invention.

FIG. 27 is a block diagram of the ninth embodiment of a white balance adjustment apparatus according to the invention. As shown in FIG. 27, this white balance adjustment apparatus comprises a color temperature detector 15, a green detector 26, an offset setting circuit 24b, adders 11p, 11q, and amplifiers 5a, 5b, 5c.

The red (R), green (G), and blue (B) video signals input to input terminals 1a, 1b, and 1c are input to the color temperature detector 15, from which the color temperature information Cr1, Cb1 is output. The operation of the color temperature detector 15 is the same as that of the color temperature detector 15 in the second embodiment above, and further description is therefore omitted below. The RGB video signals are also input to the green detector 26, which detects whether there are many green-colored subjects contained in the screen, outputs a HIGH signal if there is a high green percentage, and outputs a LOW signal otherwise. The operation of this green detector 26 is the same as that of the eighth embodiment, and further description is therefore omitted below.

Figure 28:
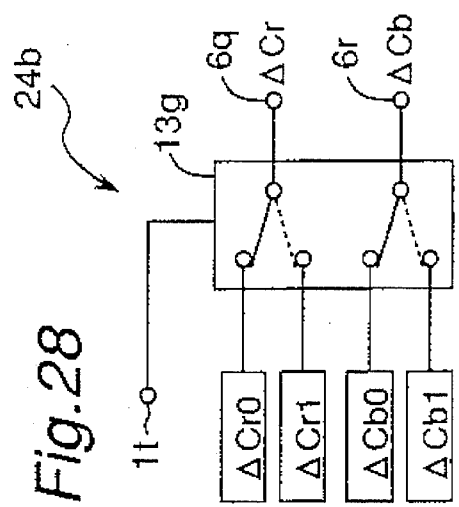
FIG. 28 is a block diagram of the offset setting circuit in the ninth embodiment of the present invention.

The green detection signal is output from the green detector 26 to the offset setting circuit 24b, which sets and outputs the offset value according to the input signal from the green detector 26. The offset setting circuit 24b is described in detail below with reference to FIG. 28.

The multiplexer 13g selects (ΔCb0, ΔCr0) when the green detection signal input to input terminal it is HIGH, selects (ΔCb1, ΔCr1), as shown by the dotted line, but when the green detection signal is LOW, selects (ΔCb0, ΔCr0), as shown by the real line. The selected signals are produced from output terminals 6q and 6r as (ΔCb, ΔCr).

The adders 11p and 11q in FIG. 27 then add the Cb1 and Cr1 outputs from the color temperature detector 15 with the corresponding outputs ΔCb and ΔCr from the offset setting circuit 24b, and apply the resulting sum signals Cbs' and Crs' to amplifiers 5a and 5c, and thus output white-balanced video signals from output terminals 6a, 6b, and 6c.

Note that the present embodiment applies the offset value only when ΔCb0 and ΔCr0 are positive values and ΔCb1 and ΔCr1 are each 0, i.e., when green is detected. It is commonly accepted that achromatic color can be obtained by averaging the colors of various subjects, but when recording outdoors, there is generally a predominance of low color temperature subject matter such as greens and yellows within the viewing area. The effect of this ninth embodiment is therefore to obtain high precision white balance control by detecting green outdoor subject matter by a green detector, and apply an offset value to the color temperature information detected by the color temperature detector only when green is detected.

A tenth embodiment of a white balance adjustment apparatus according to the present invention is described below with reference to the accompanying figures. The object of this embodiment is to obtain high precision white balance control in a short period of time by setting the white balance state when the power is turned on to approximately the center of the range of color temperature change.

Figure 29:
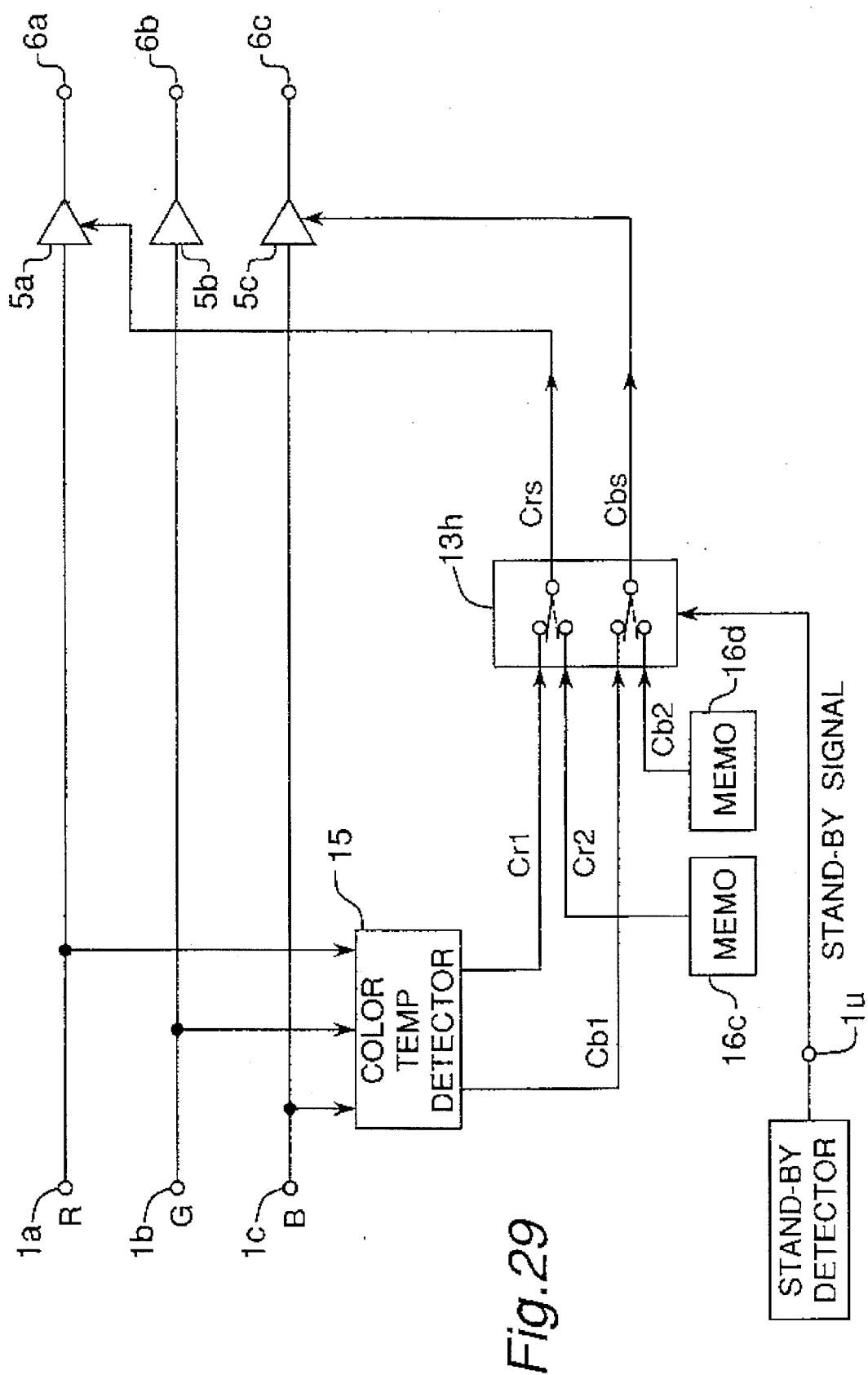
FIG. 29 is a block diagram of a white balance adjustment apparatus according to the tenth embodiment of the present invention.

FIG. 29 is a block diagram of the tenth embodiment of a white balance adjustment apparatus according to the invention. As shown in FIG. 29, this white balance adjustment apparatus comprises a color temperature detector 15, memories 16c, 16d, a multiplexer 13h, and amplifiers 5a, 5b, 5c.

The red (R), green (G), and blue (B) video signals input to input terminals 1a, 1b, and 1c are input to the color temperature detector 15, from which the color temperature information Cr1, Cb1 is output. The operation of the color temperature detector 15 is the same as that of the color temperature detector 15 in the second embodiment above, and further description is therefore omitted below. Terminal 1u is supplied with a stand-by signal, such as when the main power is turned on, from a stand-by detector.

The multiplexer 13h selects the color temperature information Cb2 and Cr2 (dotted line) stored in the memory 16b when the signal input to input terminal 1u and indicating that the power was turned on is HIGH, i.e., when the power is turned on; and otherwise selects the color temperature information Cr1 and Cb1 (real line) output from the color temperature detector 15. The selected signals are output from the multiplexer 13h as Cbs and Crs. The Cbs and Crs output signals from the multiplexer 13h are input to the amplifiers 5a and 5c, respectively, and thus output white-balanced video signals from output terminals 6a, 6b, and 6c.

Note that the color temperature information Cb2 and Cr2 stored in the memories 16c and 16d are preset to approximately the middle of the color temperature detection range. While the white balance gain calculator 4, such as provided in the color temperature detector 15, does not immediately track changes in the color temperature information in order to avoid unnaturalness caused by sudden color balance changes, the embodiment described above can still adjust the white balance to either the low color temperature side or the high color temperature side in a short time after the power is turned on, and the error in the white balance adjustment when the power is turned on will be minimized whether the actual color temperature of the scene is on the high or low side.

An eleventh embodiment of a white balance adjustment apparatus according to the present invention is described below with reference to the accompanying figures. The object of this embodiment is to obtain high precision white balance control in a short period of time by setting the white balance state when the power is turned on to approximately the center of the range of color temperature change, and to set the white balance to approximately the center of the range of the color temperature change in outdoor light when the recording scene is determined, based on brightness information, to be outdoors.

Figure 30:
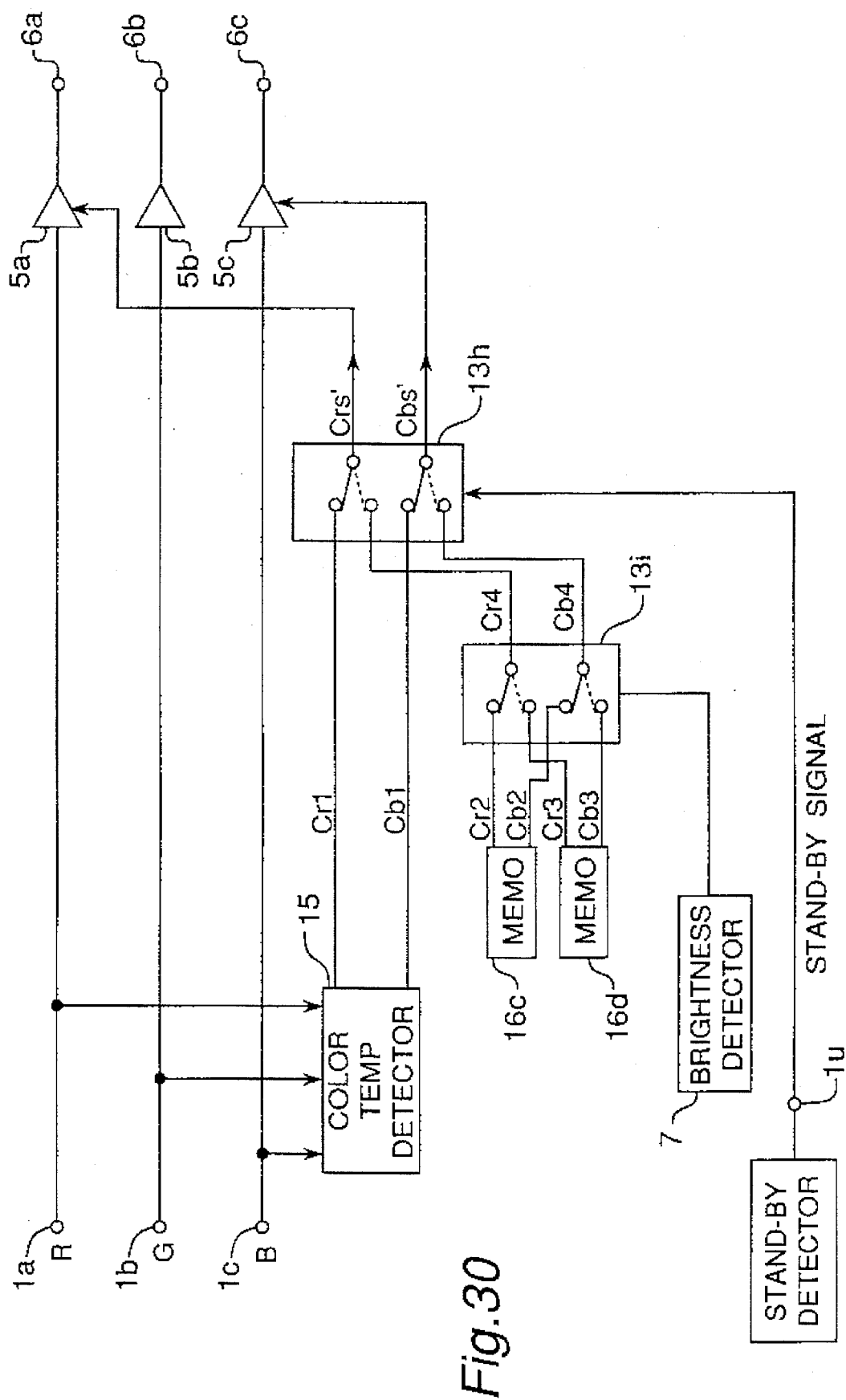
FIG. 30 is a block diagram of a white balance adjustment apparatus according to the eleventh embodiment of the present invention.

FIG. 30 is a block diagram of the eleventh embodiment of a white balance adjustment apparatus according to the invention. As shown in FIG. 30, this white balance adjustment apparatus comprises a color temperature detector 15, memories 16c, 16d, brightness detector 7, multiplexers 13h and 13i, and amplifiers 5a, 5b, 5c.

The red (R), green (G), and blue (B) video signals input to input terminals 1a, 1b, and 1c are input to the color temperature detector 15, from which the color temperature information Cr1, Cb1 is output. The operation of the color temperature detector 15 is the same as that of the color temperature detector 15 in the second embodiment above, and further description is therefore omitted below.

The stored value multiplexer 13i selects, as shown by the dotted line, the data (Cb3, Cr3) stored in the one memory 16d when the output signal from the brightness detector is HIGH, i.e., when the scene is determined to be outdoors, and selects, as shown by the real line, the data (Cb2, Cr2) stored in the other memory 16c when the output signal from the brightness detector 7 is LOW. The multiplexer 13i outputs the selected values as Cb4 and Cr4 to the second multiplexer 13h. Note that the operation of the brightness detector 7 is the same as that in the first embodiment above, and further description is therefore omitted below.

The second multiplexer 13h selects, as shown by the dotted line, the color temperature information Cb4 and Cr4 output from the first multiplexer 13i when the signal input to input terminal 1u and indicating that the power was turned on is HIGH, i.e., when the power is turned on, and otherwise selects, as shown by the real line, the color temperature information Cr1, Cb1 output from the color temperature detector 15. The selected signals are output from the multiplexer 13h as Cbs' and Crs'. The Cbs' and Crs' output signals are input to the amplifiers 5a and 5c, respectively.

Note that the color temperature information Cb2 and Cr2 stored in the memory 16c is preset to approximately the middle of the color temperature detection range. In addition, the color temperature information Cb3 and Cr3 stored in the memory 16d is preset to approximately the middle of the outdoor color temperature detection range. While the white balance gain calculator 4 does not immediately track changes in the color temperature information in order to avoid unnaturalness caused by sudden color balance changes, the embodiment described above can still adjust the white balance to either the low color temperature side or the high color temperature side in a short time after the power is turned on, and the error in the white balance adjustment when the power is turned on will be minimized whether the actual color temperature of the scene is on the high or low side. Because the white balance is set to approximately the middle of the outdoor color temperature detection range when the recording scene is determined to be outdoors based on the brightness information, it is also possible to correctly adjust the white balance in a short time, and the error in the white balance adjustment when the power is turned on will be minimized, when recording outdoors.

A twelfth embodiment of a white balance adjustment apparatus according to the present invention is described below with reference to the accompanying figures. The object of this embodiment is to obtain more natural white balance control by tracking the white balance adjustment toward the yellow side when the detected color temperature is on the low side, and tracking the white balance adjustment toward the green side when the detected color temperature is on the high side, rather than linearly tracking the detected color temperature.

Figure 31:
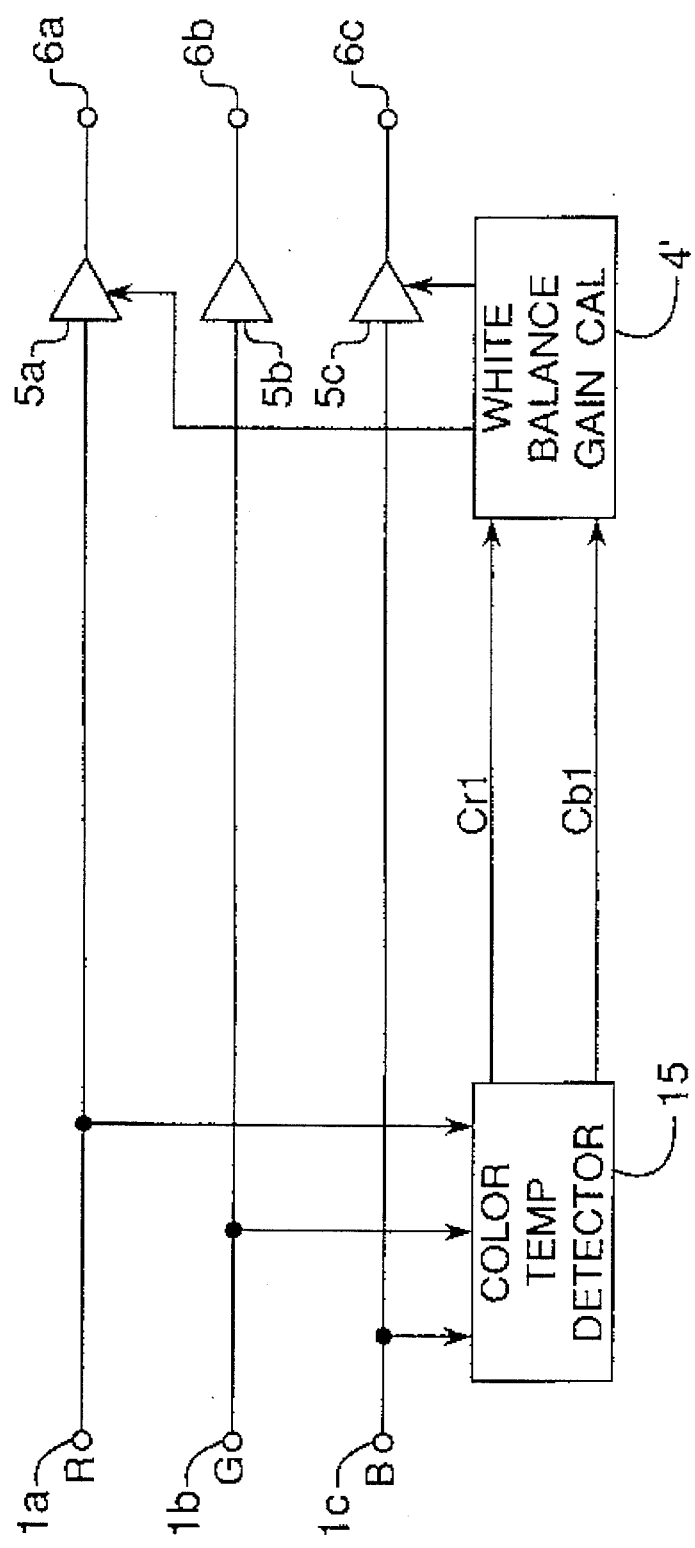
FIG. 31 is a block diagram of a white balance adjustment apparatus according to the twelfth embodiment of the present invention.

FIG. 31 is a block diagram of the twelfth embodiment of a white balance adjustment apparatus according to the invention. As shown in FIG. 31, this white balance adjustment apparatus comprises a color temperature detector 15, a white balance gain calculator 4', and amplifiers 5a, 5b, 5c.

The red (R), green (G), and blue (B) video signals input to input terminals 1a, 1b, and 1c are input to the color temperature detector 15, from which the color temperature information Cr1, Cb1 is output. The operation of the color temperature detector 15 is the same as that of the color temperature detector 15 in the second embodiment above, and further description is therefore omitted below.

The output signals Cb1 and Cr1 of the color temperature detector 15 are input to the white balance gain calculator 4', which calculates the white balance gain to adjust the gain of amplifiers 5a and 5c, and thus output white-balanced video signals from output terminals 6a, 6b, and 6c. When calculating the white balance gain, the white balance gain calculator 4' increases the amount of change in the blue direction when the color temperature detected by the color temperature detector 15 is lower than the color temperature of the current white balance control level, and increase the amount of change in the red direction when the detected color temperature is greater than the color temperature of the current white balance control level.

Figure 32:
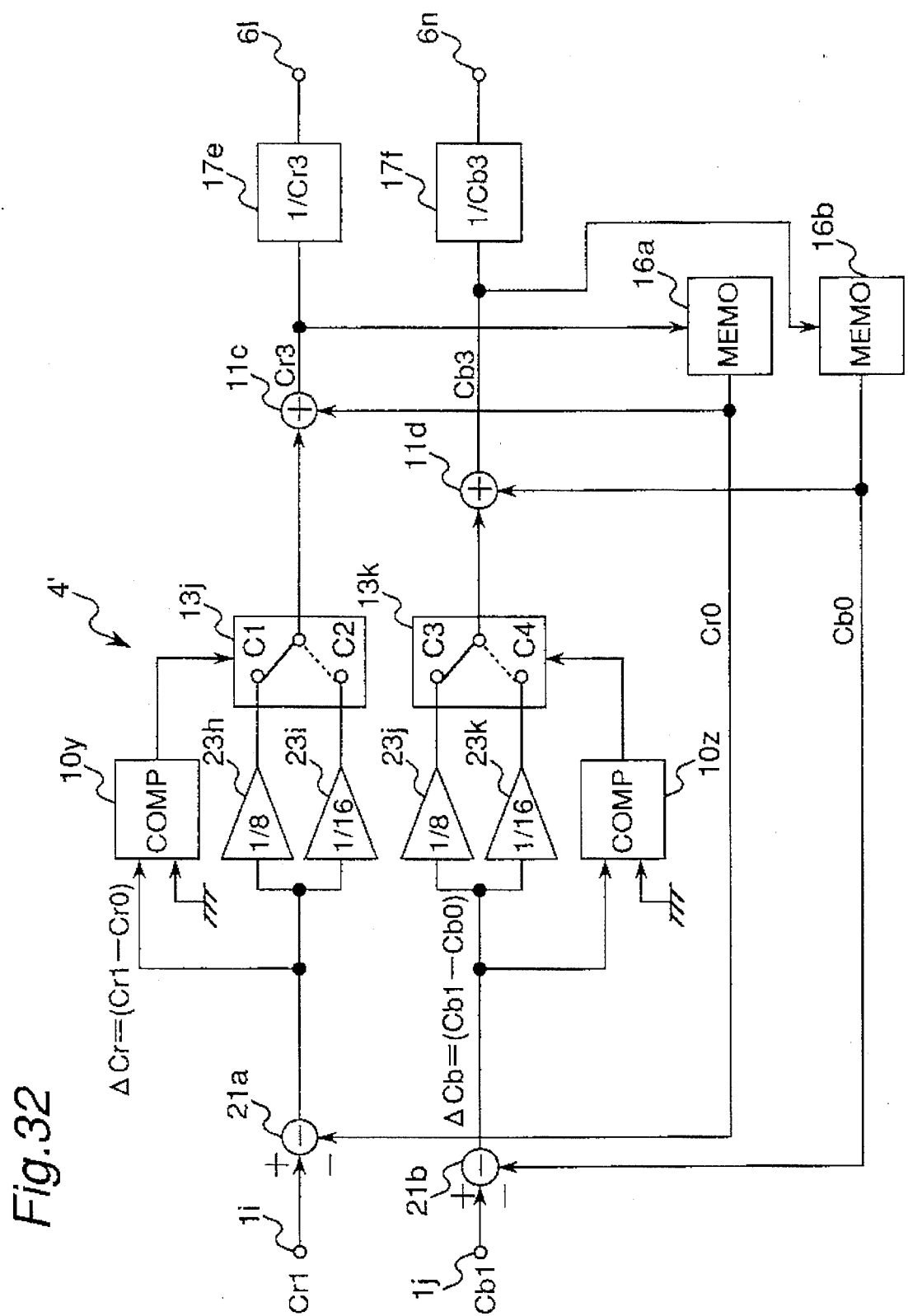
FIG. 32 is a block diagram of the white balance gain calculator in the twelfth embodiment of the invention.

FIG. 32 is a block diagram of the white balance gain calculator 4'. As shown in FIG. 32, this white balance gain calculator 4' comprises subtractors 21a, 21b, amplifiers 23h, 23i, 23j, 23k, comparators 10y, 10z, multiplexers 13j and 13k, adders 11c, 11d, memories 16a, 16b, and dividers 17e, 17f.

The color temperature information Cr1 input to input terminal 1i is applied to the subtractor 21a, which subtracts the current color temperature control information Cr0 input from the memory 16 from newly obtained color temperature control information Cr1 to obtain the difference signal output as ΔCr. This difference signal ΔCr is then amplified ⅛-time and ¹⁄₁₆-time by amplifiers 23h and 23i, respectively, and the results are input to the corresponding multiplexer 13j having terminals C1 and C2. This difference signal ΔCr is also input to the corresponding comparator 10y, which outputs a HIGH signal when ΔCr is positive, and outputs a LOW signal when ΔCr is negative.

The multiplexer 13j selects C2 (dotted line), i.e., the output of the ¹⁄₁₆-times amplifier 23i when the output of the comparator 10y is HIGH, and selects C1 (real line), i.e., the output of the ⅛-times amplifier 23h when LOW.

The adder 11c then adds the output from the multiplexer 13j to the color temperature information Cr0 stored in the memory 16, and outputs the result as Cr3. The inverse of Cr3 is then obtained by divider 17e, and this inverse value is output from output terminal 61 as the white balance gain.

The color temperature information Cb1 input to input terminal 1j is applied to the subtractor 21b, which subtracts the current color temperature control information Cb0 input from the memory 16 from Cb1 to obtain the difference signal output as ΔCb. This difference signal ΔCb is then amplified ⅛-time and ¹⁄₁₆-time by amplifiers 23j and 23k, respectively, and the results are input to the corresponding multiplexer 13k having terminals C3 and C4. This difference signal ΔCb is also input to the corresponding comparator 10z, which outputs a HIGH signal when ΔCb is positive, and outputs a LOW signal when ΔCb is negative.

The multiplexer 13k selects C4 (dotted line), i.e., the output of the ¹⁄₁₆-times amplifier 23k when the output of the comparator 10z is HIGH, and selects C3 (real line), i.e., the output of the ⅛-times amplifier 23j when LOW.

The adder 11d then adds the output from the multiplexer 13k to the color temperature information Cb0 stored in the memory 16, and outputs the result as Cb3. The inverse of Cb3 is then obtained by divider 17f, and this inverse value is output from output terminal 6n as the white balance gain.

The white balance gain calculator 4' thus outputs to the amplifiers 5a and 5c to output a white-balanced video signal from output terminals 6a, 6b, and 6c.

When the detected color temperature is lower than the current white balance control color temperature, i.e., when $Cr1$ is greater than $Cr0$, and $Cb1$ is less than $Cb0$, the color temperature information Cb3 and Cr3 thus obtained are set so that the change in Cb is greater than the change in Cr. As a result, the white balance is tracked along a curve resembling dotted line A in the color temperature coordinate space shown in FIG. 33.

Figure 33:
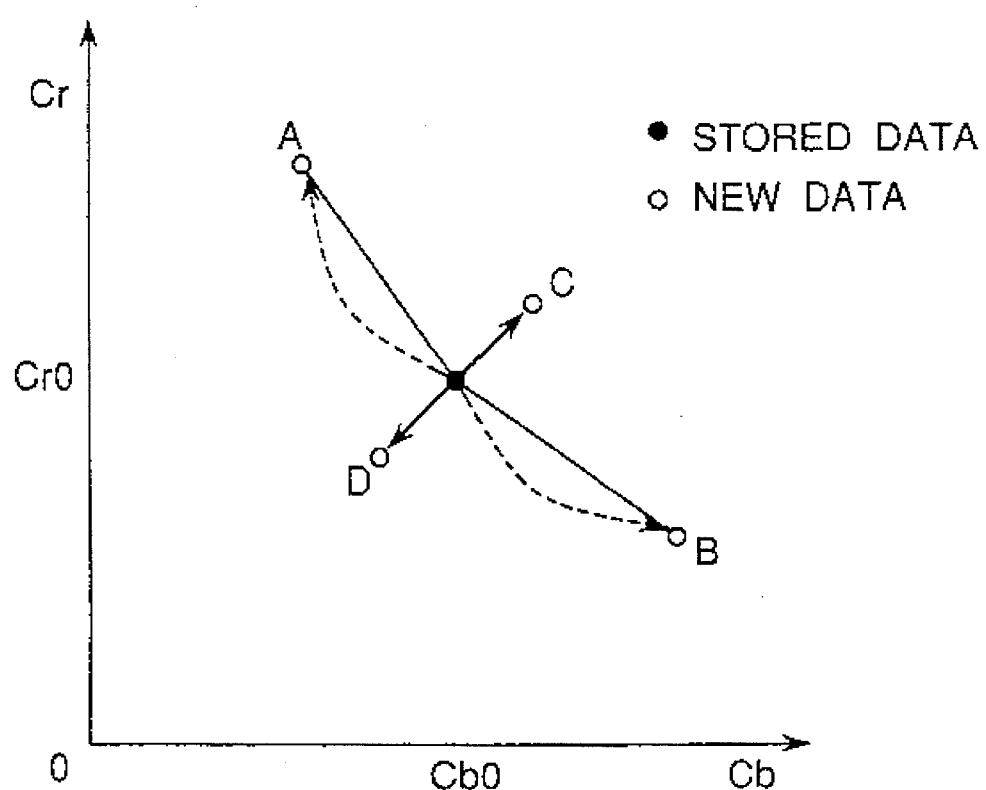
FIG. 33 is a color temperature coordinate space graph for the white balance gain calculator in the twelfth embodiment of the invention.
Figure 34:
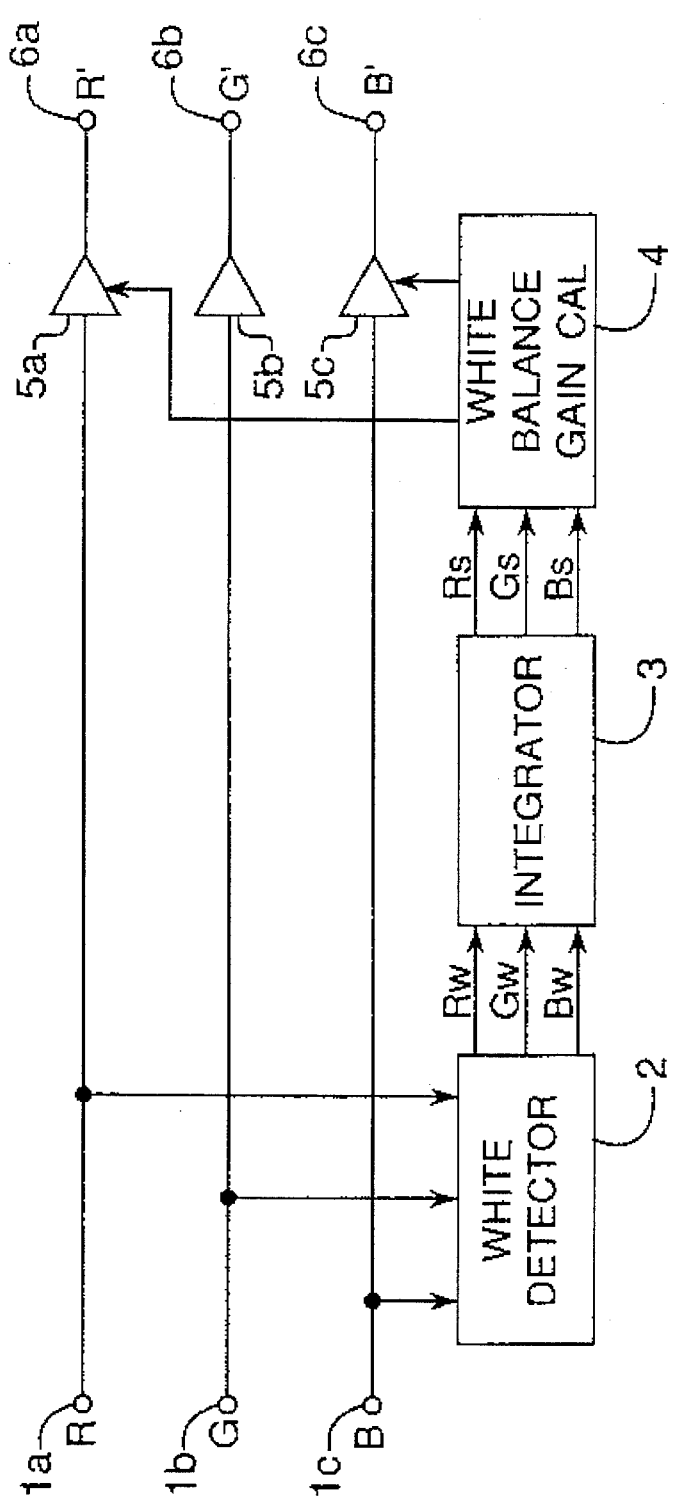
FIG. 34 is a block diagram of a conventional white balance adjustment apparatus.
Figure 35:
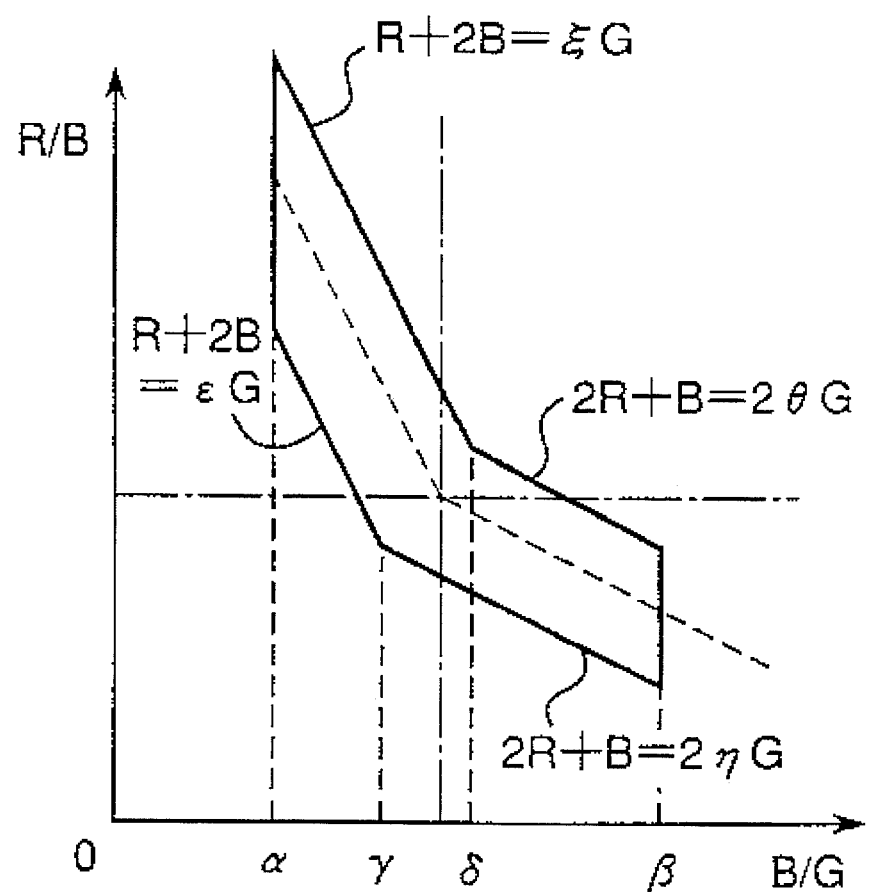
FIG. 35 is a color temperature coordinate space graph showing the white detection area of the white detector in a conventional white balance adjustment apparatus.

Note that in FIG. 33 color temperature information Cb is on the axis of abscissas, Cr is on the axis of ordinates, ● indicates the stored and currently used white balance control color temperature information (Cb0, Cr0), and ○ indicates the newly detected color temperature information (Cb1, Cr1).

When the detected color temperature is higher than the current white balance control color temperature, i.e., when $Cr1$ is less than $Cr0$, and $Cb1$ is greater than $Cb0$, the color temperature information Cb3 and Cr3 are set so that the change in Cr is greater than the change in Cb. As a result, the white balance is tracked along a curve resembling dotted line B in the color temperature coordinate space shown in FIG. 33. The white balance is tracked linearly when there is no change in the color temperature (points C and D in FIG. 33).

In general, the axis of color temperature change in a color temperature coordinate space as shown in FIG. 33 is distributed on a curve rather than linearly. In addition, some types of fluorescent lighting have a spectral distribution biased toward the green side of the axis of color temperature change. The relationship of the selected line and the signals in the white balance gain calculator 4' is shown in Table 4 below.

TABLE 4

| 10y | 10z | C1 | C2 | C3 | C4 | Selection |
|---|---|---|---|---|---|---|
| 0 | 0 | ○ | — | ○ | — | D |
| 0 | 1 | ○ | — | — | ○ | B |
| 1 | 0 | — | ○ | ○ | — | A |
| 1 | 1 | — | ○ | — | ○ | C |

Note: ○ indicates the selected terminal.

The effect of this embodiment is therefor to obtain a more natural white balance tracking ability and minimize white balance error when operating under fluorescent lighting by tracking the white balance along a curve relative to the color temperature change.

It is to be noted that while an RGB primary color signal has been used by way of example in the descriptions of the first through twelfth embodiments above, the same effects can be obtained using Y, R-Y, and B-Y luminance and color difference signals by slightly modifying the configuration of the mode selector and the color temperature detector.

Furthermore, the first through twelfth embodiments above apply a feed-forward type color temperature detection method using the signal before white balance adjustment, but the same effects can be obtained applying a feedback-type method using the signals after white balancing by slightly modifying the configuration of the mode selector and the color temperature detector.

In addition, the video signal is used for color temperature detection in the first through twelfth embodiments above, but the same effects can be obtained by dividing each field into plural blocks and using the color signal representative of each block.

Furthermore, when using representative color signals from plural signal blocks, all operations can be processed by a microprocessor in each of first through twelfth embodiments above and the same effects can be obtained.

In the above embodiments, red (R), green (G), and blue (B) video signals are used, but other color component signals, such as R-Y, B-Y and Y signals or magenta, green, cyan, and yellow signals can be used. When magenta, green, cyan, and yellow signals are used, the color temperature information Cbs and Crs will be used for the amplification factors of the amplifiers for the magenta+yellow and the magenta+cyan.

By the invention thus described, it is possible to restrict the white detection area when exposed to particularly bright outdoor light by setting the white detection area according to the brightness information of the subject detected by a brightness detector, integrating only the signals within the set white detection area, calculating the white balance gain from the integrated values, and adjusting the amplification factor by the calculated white balance gain. As a result, even when relatively light colors, such as white skin tones and green outdoors, near the axis of color temperature change are in the field the color signals therefrom will not be falsely detected as achromatic, and related operating errors, such as fading causing white skin tones to appear washed out, can be effectively prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A white balance adjustment apparatus for adjusting color component video signals of an aiming subject, comprising:

amplifying means for amplifying said color component video signals, separately;

color temperature detecting means for detecting a color temperature of the subject and for producing a color temperature signal;

memory means for storing said color temperature signal; and selector means for:

a) selecting one of:
      1) said color temperature signal currently produced by said color temperature detecting means; and
      2) said color temperature signal previously stored in said memory means based upon measured characteristics of a plurality of said color component video signals, and b) using the color temperature signal selected by the selector means for controlling said amplifying means.

2. A white balance adjustment apparatus for adjusting color component video signals of an aiming subject according to claim 2, further comprising shift amount detecting means for detecting a shift amount between the color temperature signal from said color temperature detecting means and the color temperature signal from said memory means, and for producing a first shift amount signal when the shift amount is smaller than a predetermined range, and for producing a second shift amount signal when the shift amount is greater than said predetermined range; and wherein said selector means selects the color temperature signal from said color temperature detecting means in response to said second shift amount signal and selects the color temperature signal from said memory means in response to said first shift amount signal, and uses the color temperature signal selected by the selector means for controlling said amplifying means.

3. A white balance adjustment apparatus according to claim 2, wherein said shift amount detecting means comprises:

subtractor means for obtaining difference between said color temperature signal from said color temperature detecting means and said color temperature signal from said memory means; and comparing means for comparing said difference with a predetermined threshold level.

4. A white balance adjustment apparatus for adjusting color component video signals of an aiming subject according to claim 1, further comprising green detecting means for detecting green characteristics of the subject, and for producing a greenish signal when the subject is detected as greenish; and wherein said selector means selects the color temperature signal from said color temperature detecting means when said greenish signal is absent, and the color temperature signal from said memory means when said greenish signal is present, and uses the color temperature signal selected by the selector means for controlling said amplifying means.

* * * * *

UNITED STATES PATENT AND TRADE MARK OFFICE
CERTIFICATE OF CORRECTION

PATENT NO. : 5,541,649
DATED : July 30, 1996
INVENTOR(S) : Yamamoto et al.

Page 1 of 2

It is certified that error appears in the above-identified patent and that said Letters Patent is hereby corrected as shown below:

Column 26, lines 38-58 should read:

1. A white balance adjustment apparatus for adjusting color component video signals of an aiming subject, comprising:

amplifying means for amplifying said color component video signals, separately;

color temperature detecting means for detecting a color temperature of the subject and for producing a color temperature signal;

memory means for storing said color temperature signal; and selector means for:

a) selecting one of:

1) said color temperature signal currently produced by said color temperature detecting means; and

UNITED STATES PATENT AND TRADE MARK OFFICE
CERTIFICATE OF CORRECTION

PATENT NO. : 5,541,649
DATED : July 30, 1996
INVENTOR(S) : Yamamoto et al.

It is certified that error appears in the above-identified patent and that said Letters Patent is hereby corrected as shown below:

2) said color temperature signal previously stored in said memory means based upon measured characteristics of a plurality of said color component video signals, and b) using the color temperature signal selected by the selector means for controlling said amplifying means.

Column 26, line 61, delete "2" and insert --1--.

Signed and Sealed this

Twenty-fifth Day of March, 1997

*Attest:*

BRUCE LEHMAN

*Attesting Officer*     *Commissioner of Patents and Trademarks*